US012562563B2

(12) United States Patent
Brower et al.

(10) Patent No.: US 12,562,563 B2
(45) Date of Patent: *Feb. 24, 2026

---

(54) GROUND FAULT CIRCUIT INTERRUPTER WITH INTEGRATED CONTROLLER

(71) Applicant: Hubbell Incorporated, Shelton, CT (US)

(72) Inventors: John E. Brower, Fairfield, CT (US); James Casey Musson, Derby, CT (US); William Vernon Miller, III, Aldie, VA (US); Joseph Michael Meady, Stratford, CT (US); Joseph Edgar Dupuis, Griswold, CT (US); Brian S. Chia, Cheshire, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,456

(22) Filed: Jun. 25, 2024

(65) Prior Publication Data

US 2024/0421586 A1      Dec. 19, 2024

Related U.S. Application Data

(63) Continuation of application No. 17/723,973, filed on Apr. 19, 2022, now Pat. No. 12,021,370.

(Continued)

(51) Int. Cl.
*H02H 3/16* (2006.01)
*H02H 1/00* (2006.01)

(52) U.S. Cl.
CPC ............ *H02H 3/16* (2013.01); *H02H 1/0007* (2013.01)

(58) Field of Classification Search
CPC .......... H02H 1/0007; H02H 3/16; H02H 3/17; H02H 3/334
See application file for complete search history.

(56) References Cited

U.S. PATENT DOCUMENTS 7,315,437 B2 *  1/2008  Bonilla ................... H02H 3/05
361/42
7,441,173 B2 *  10/2008  Restrepo ............... H02H 3/334
361/103

(Continued)

FOREIGN PATENT DOCUMENTS

WO      WO-2022226047 A2 *  10/2022   ........... H02H 1/0007

OTHER PUBLICATIONS

PCT/US2022/025514 International Search Report and Written Opinion dated Oct. 5, 2022 (9 pages).

*Primary Examiner* — Danny Nguyen
*Assistant Examiner* — Nicolas Bellido
(74) *Attorney, Agent, or Firm* — Michael Best & Friedrich LLP

(57) ABSTRACT

A circuit interrupting device including a phase conductor, a neutral conductor, an interrupter configured to disconnect the phase conductor and the neutral conductor from a load, and a sensor configured to generate a signal indicative of current flowing through the phase conductor and the neutral conductor. The circuit interrupting device further includes a microcontroller that includes an electronic processor and is electrically connected to the first sensor and the interrupter. The microcontroller is configured to generate a reference signal, receive a first signal from the sensor, determine whether a difference between a voltage of the first signal and a voltage of the reference signal exceeds a threshold, determine whether the microcontroller has performed a ground fault self-test, and activate the interrupter when the differ- (Continued)

ence exceeds the threshold and the microcontroller has not performed the ground fault self-test.

13 Claims, 19 Drawing Sheets

Related U.S. Application Data

(60) Provisional application No. 63/177,151, filed on Apr. 20, 2021.

(56) References Cited

U.S. PATENT DOCUMENTS

|  |  |  |  |  |
|---|---|---|---|---|
| 9,608,433 | B2 | 3/2017 | Simonin et al. | |
| 10,243,343 | B2 | 3/2019 | Miller, III et al. | |
| 10,468,866 | B2 | 11/2019 | Simonin | |
| 10,541,526 | B2 | 1/2020 | Batko et al. | |
| 10,630,089 | B2 | 4/2020 | Zhong et al. | |
| 10,656,199 | B2 | 5/2020 | Ostrovsky | |
| 11,211,781 | B2 | 12/2021 | Batko et al. | |
| 11,349,293 | B2 | 5/2022 | Ostrovsky | |
| 2007/0279814 | A1 | 12/2007 | Bonilla et al. | |
| 2014/0177118 | A1* | 6/2014 | Elms ...................... | H02H 5/047 |
| | | | | 361/103 |
| 2017/0125996 | A1* | 5/2017 | Batko ...................... | H02H 3/46 |
| 2017/0322254 | A1 | 11/2017 | Ostrovsky et al. | |
| 2018/0138723 | A1 | 5/2018 | Zhong et al. | |
| 2019/0363531 | A1 | 11/2019 | Ostrovsky et al. | |
| 2020/0161849 | A1 | 5/2020 | Batko et al. | |

* cited by examiner

GROUND FAULT CIRCUIT INTERRUPTER WITH INTEGRATED CONTROLLER

RELATED APPLICATIONS

This application claims the benefit of U.S. Non-Provisional patent application Ser. No. 17/723,973, filed Apr. 19, 2022, which claims the benefit of U.S. Provisional Patent Application No. 63/177,151, filed Apr. 20, 2021, the entire content of which is hereby incorporated by reference.

FIELD

The present disclosure relates generally to switched electrical devices. More particularly, the present application is directed to circuit interrupting devices, such as ground fault circuit interrupter (GFCI) devices, that switch to a "tripped" or unlatched state from a "reset" or latched state when one or more conditions are detected.

SUMMARY

A first aspect of the present disclosure provides a circuit interrupting device including a phase conductor, a neutral conductor, an interrupter configured to disconnect the phase conductor and the neutral conductor from a load, and a sensor configured to generate a signal indicative of current flowing through the phase conductor and the neutral conductor. The circuit interrupting device further includes a microcontroller that includes an electronic processor and is electrically connected to the first sensor and the interrupter. The microcontroller is configured to generate a reference signal, receive a first signal from the sensor, determine whether a difference between a voltage of the first signal and a voltage of the reference signal exceeds a threshold, determine whether the microcontroller has performed a ground fault self-test, and activate the interrupter when the difference exceeds the threshold and the microcontroller has not performed the ground fault self-test.

Another aspect of the present disclosure provides a method of operating a circuit interrupting device that includes a phase conductor, a neutral conductor, an interrupter configured to disconnect the phase conductor and the neutral conductor from a load, a sensor configured to generate a signal indicative of current flowing through the phase conductor and the neutral conductor, and a microcontroller electrically connected to the sensor and the interrupter, the microcontroller including an electronic processer. The method includes generating, by the microcontroller, a reference signal, receiving, by the microcontroller, a first signal indicative of the current flowing through the phase conductor and the neutral conductor from the sensor, and determining, by the microcontroller, whether a difference between a voltage of the first signal and a voltage of the reference signal exceeds a threshold. The method further includes determining, by the microcontroller, whether the microcontroller has performed a ground fault self-test and activating, by the microcontroller, the interrupter when the difference exceeds the threshold and the microcontroller has not performed the ground fault self-test.

Another aspect of the present disclosure provides a circuit interrupting device including a first printed circuit board (PCB) including a ground fault detection circuit, a first connection interface, and a second connection interface. The circuit interrupting device further includes a second PCB electrically connected to the first PCB via the first connection interface, the second PCB including a wireless communication circuit and an indicator circuit. Furthermore, the circuit interrupting device includes a third PCB electrically connected to the first PCB via the second connection interface, the third PCB including an arc fault detection circuit, and a microcontroller that includes an electronic processor and is electrically connected to the ground fault detection circuit, the wireless communication circuit, the indicator circuit, and the arc fault detection circuit.

Other aspects of the application will become apparent by consideration of the detailed description and accompanying drawings.

DETAILED DESCRIPTION

Figure 1:
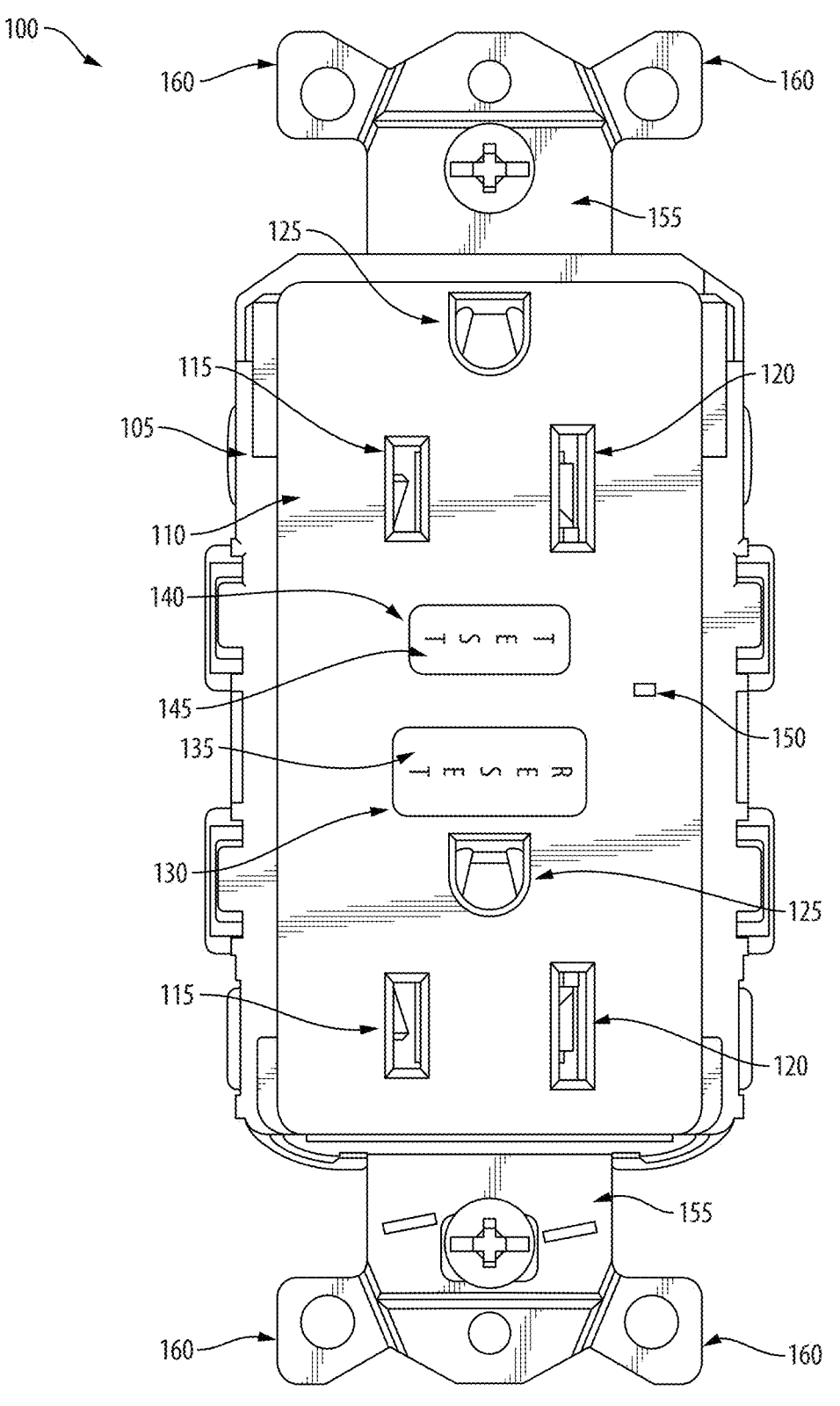
FIG. 1 illustrates a perspective view of a GFCI device, or GFCI receptacle, according to some embodiments.

Before any embodiments of the application are explained in detail, it is to be understood that the application is not limited in its application to the details of construction and the arrangement of components set forth in the following description or illustrated in the following drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

FIG. 1 illustrates a frontal view of a GFCI device, or GFCI receptacle, 100 according to some embodiments of the present disclosure. The GFCI receptacle 100 includes a front cover 105 having a duplex outlet face 110 with a phase, or hot, opening 115, a neutral opening 120, and a ground opening 125. The face 110 further has opening 130, accommodating a RESET button 135, an adjacent opening 140, accommodating a TEST button 145, and one or more additional openings 150. In some embodiments, the one or more additional openings 150 accommodate indicators, such as but not limited to, various colored light-emitting diodes (LEDs). In some embodiments, the one or more additional openings 150 accommodate bright LEDs used, for example, as a nightlight. In some embodiments, the one or more additional openings 150 accommodate a photoconductive photocell used, for example, to control the nightlight LEDs. In some embodiments, the one or more additional openings 150 provide access to a set screw for adjusting a photocell device or a buzzer in accordance with this, as well as other, embodiments. The GFCI receptacle 100 also includes a rear cover (not shown or enumerated) that is secured to the front cover 105 by a plurality of fasteners (not shown or enumerated) and a ground yoke/bridge assembly 155. The ground yoke/bridge assembly 155 includes standard mounting cars 160 that protrude from ends of the receptacle 100.

Figure 2:
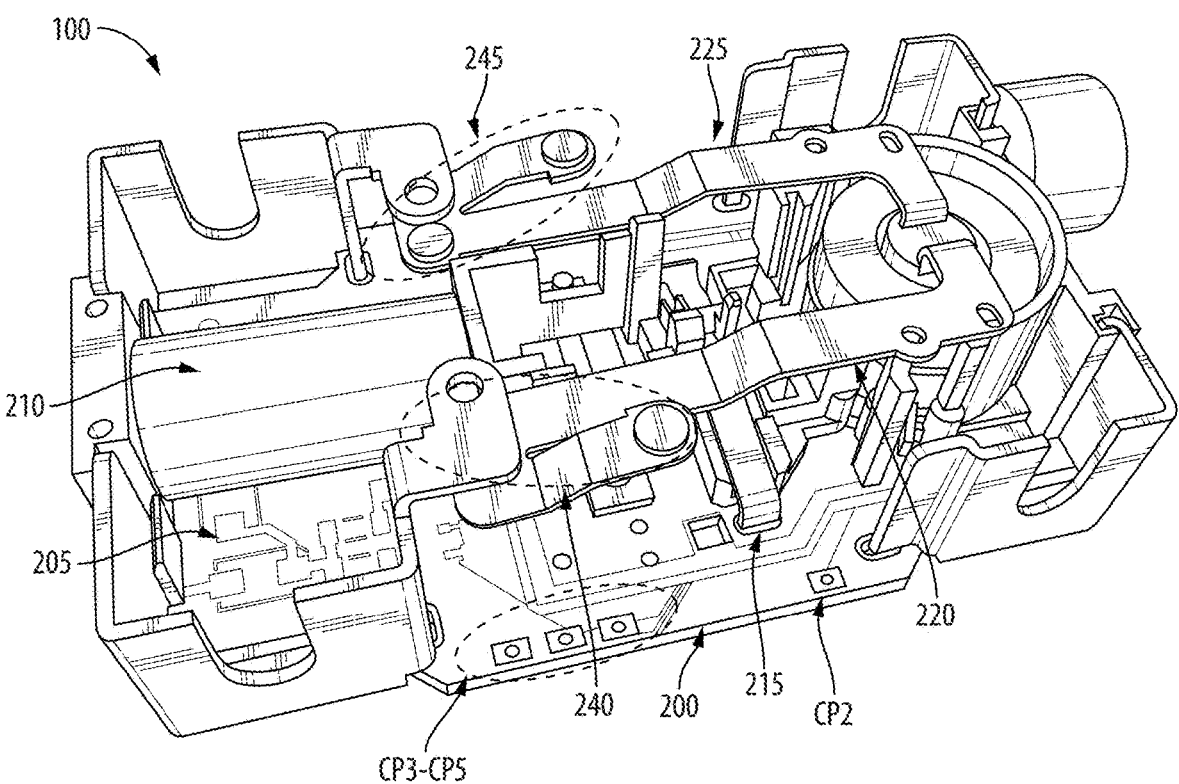
FIG. 2 illustrates a perspective view of the GFCI receptacle of FIG. 1 with a front cover removed to expose a primary printed circuit board (PCB), according to some embodiments.
Figure 3:
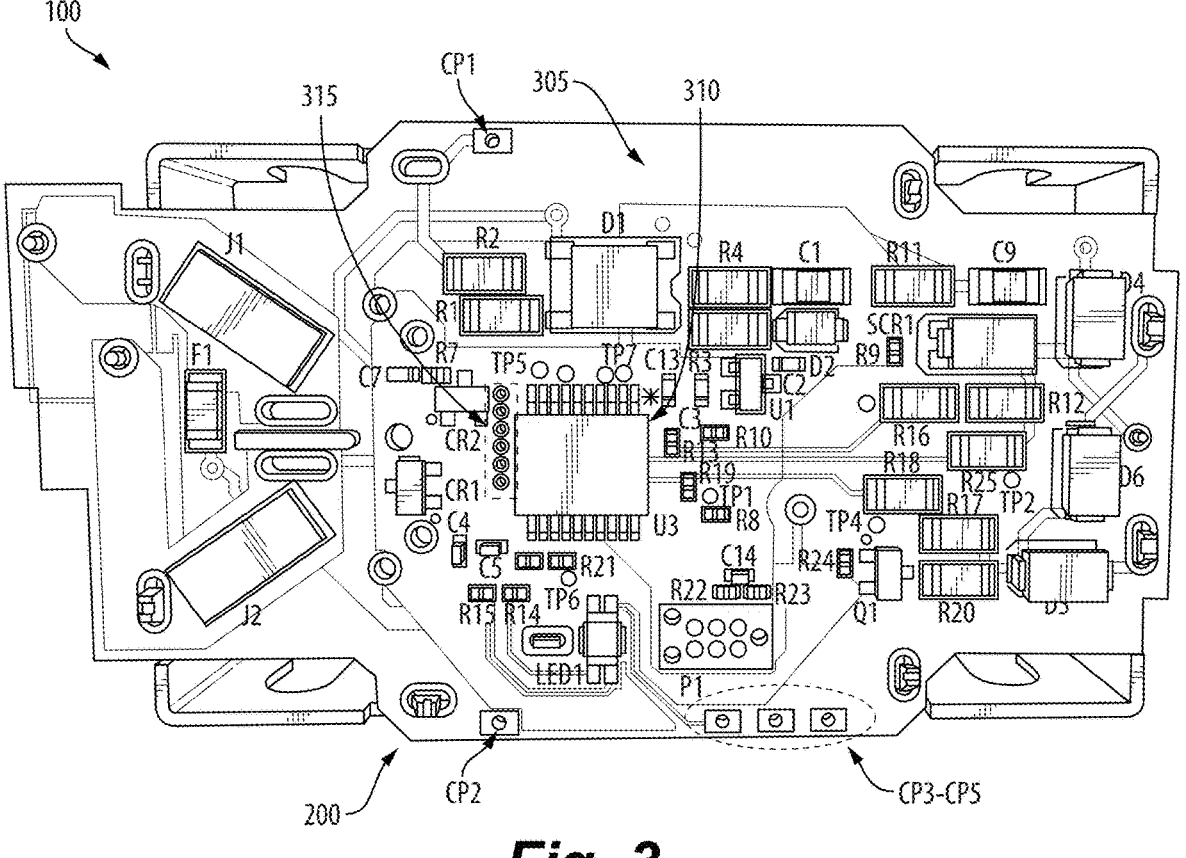
FIG. 3 illustrates a perspective view of the primary PCB of FIG. 2, according to some embodiments.
Figure 6:
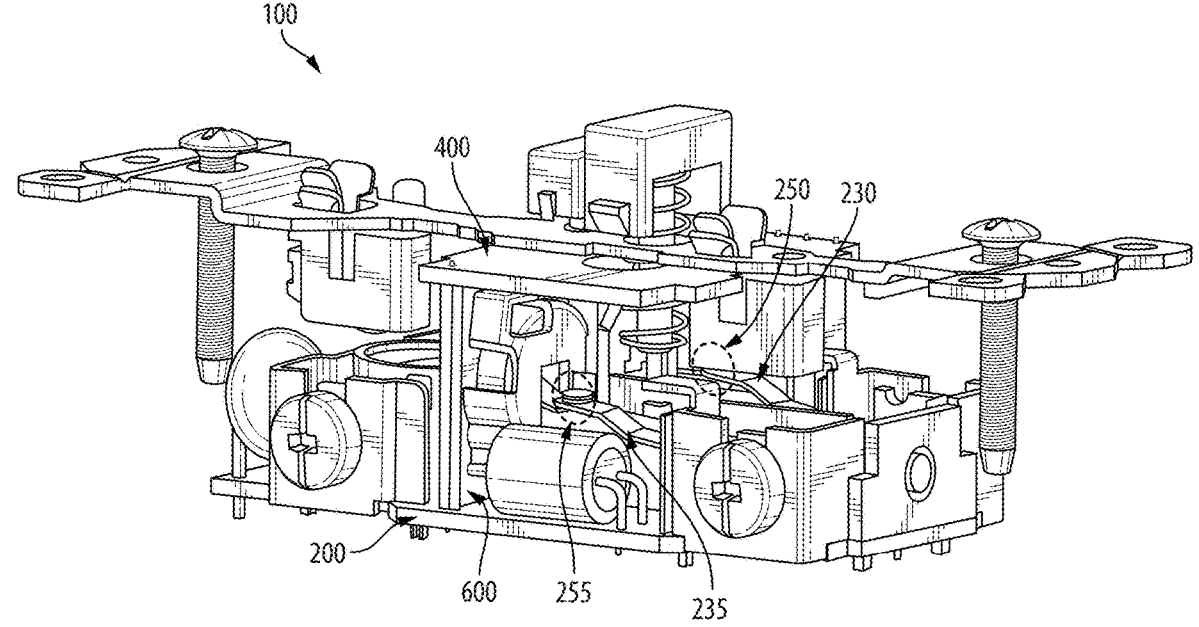
FIG. 6 illustrates a perspective view of the GFCI receptacle of FIG. 1 with a front cover removed to expose a third PCB, according to some embodiments.

FIGS. 2 and 3 illustrate perspective views of the GFCI receptacle 100 in which the front cover 105, rear cover, and other components have been removed to expose a primary printed circuit board (PCB), or primary board, 200 according to some embodiments. The primary board 200 provides control and physical support for most of the working components included in the GFCI receptacle 100. For example, as shown in FIG. 2, a top surface 205 of the primary board 200 provides support for an interrupting device, or solenoid, 210 and a low voltage switch 215, which is operable to trigger a ground fault self-test described later on. The top surface 205 further supports cantilevered phase and neutral line contact arms 220, 225 and phase and neutral load contact arms 230, 235 (FIG. 6). The respective distal ends of the line contact arms 220, 225 support the phase and neutral line contacts 240, 245. Likewise, the respective distal ends of the load contact arms 230, 235 support the phase and neutral load contacts 250, 255 (FIG. 6). The resiliency of the cantilevered line contact arms 220, 225 biases the line contacts 240, 245 away, or separated, from the load contacts 250, 255. The load contact arms 230, 235 extend from a movable contact carriage 260, which is constructed from an insulating material.

As shown in FIG. 3, the primary board 200 further includes a bottom surface 305 that provides physical and operational support for many of the control electronics included in the GFCI receptacle 100. For example, the bottom surface 305 supports a microcontroller 310. The microcontroller 310 is as an integrated circuit device, such as a Microchip microcontroller. In some embodiments, the microcontroller 310 is implemented as a PIC18F Microchip microcontroller. However, in other embodiments, the microcontroller 310 is implemented as another type of microcontroller. As will be described in more detail later on, the microcontroller 310, which includes a memory and an electronic processor, is configured to control various operations of the GFCI receptacle 100. For example, the microcontroller 310 is configured to detect the occurrence of a trip event, such as a ground fault or grounded neutral condition, and control the working components of receptacle 100 to trip, or create an open-circuit condition, in response to detecting the trip event. In addition, the microcontroller 310 is further configured to execute one or more self-test and auto-monitoring subroutines, including but not limited to, a grounded neutral detection subroutine, a frequency determination subroutine, a ground fault detection self-test subroutine, a solenoid self-test subroutine, a welded-contact subroutine, and an end of life (EOL) subroutine.

In some embodiments, the primary board 200 is configured to physically receive and/or electrically connect to one or more additional PCBs and/or auxiliary modules included in the receptacle 100. Accordingly, the primary board 200 includes one or more connection components, such as the primary compliant pin ports, or compliant pins, CP1-CP5 and the interface 315, that are configured to electrically connect the primary board 200 to one or more additional
PCBs and/or auxiliary modules. Each one of the primary
compliant pins CP1-CP5 are be individually configured to
transfer power and/or serial communication signals between
the primary board 200 and one or more additional PCBs. For
example, in some embodiments, primary compliant pins
CP1 and CP2 are configured as power pins used for trans-
ferring power between the primary board and an additional
PCB. As another example, in such embodiments, the pri-
mary compliant pins CP3-CP5 are configured as serial
communication pins used for transferring serial data signals
between the primary board 200 and an additional PCB. More
particularly, the primary compliant pins configured as serial
communication pins provide communication channels
between the microcontroller 310 and a second PCB.
Although illustrated as including five primary compliant
pins CP1-CP5, it should be understood that the primary
board 200 may include any desired number of primary
compliant pins CP1-CPN.

Similarly, each one of the pin receptacles, or ports,
included in interface 315 is individually configurable and
arranged to receive a conductor (e.g., a pin) that is electri-
cally connected to an additional PCB or auxiliary module.
For example, one or more of the ports included in interface
315 are configured as power ports, whereas other pins
included in interface 315 are configured as serial commu-
nication ports. Although illustrated as including six connec-
tion pins, other embodiments of the interface 315 include
more or less than six connection ports. Furthermore,
although the primary board 200 is illustrated as including
one interface 315, in some embodiments the primary board
200 includes one or more (e.g., 2, 3, 4, etc.) additional
interfaces used for electrical connection to additional PCBs
and auxiliary modules.

Figure 4A:
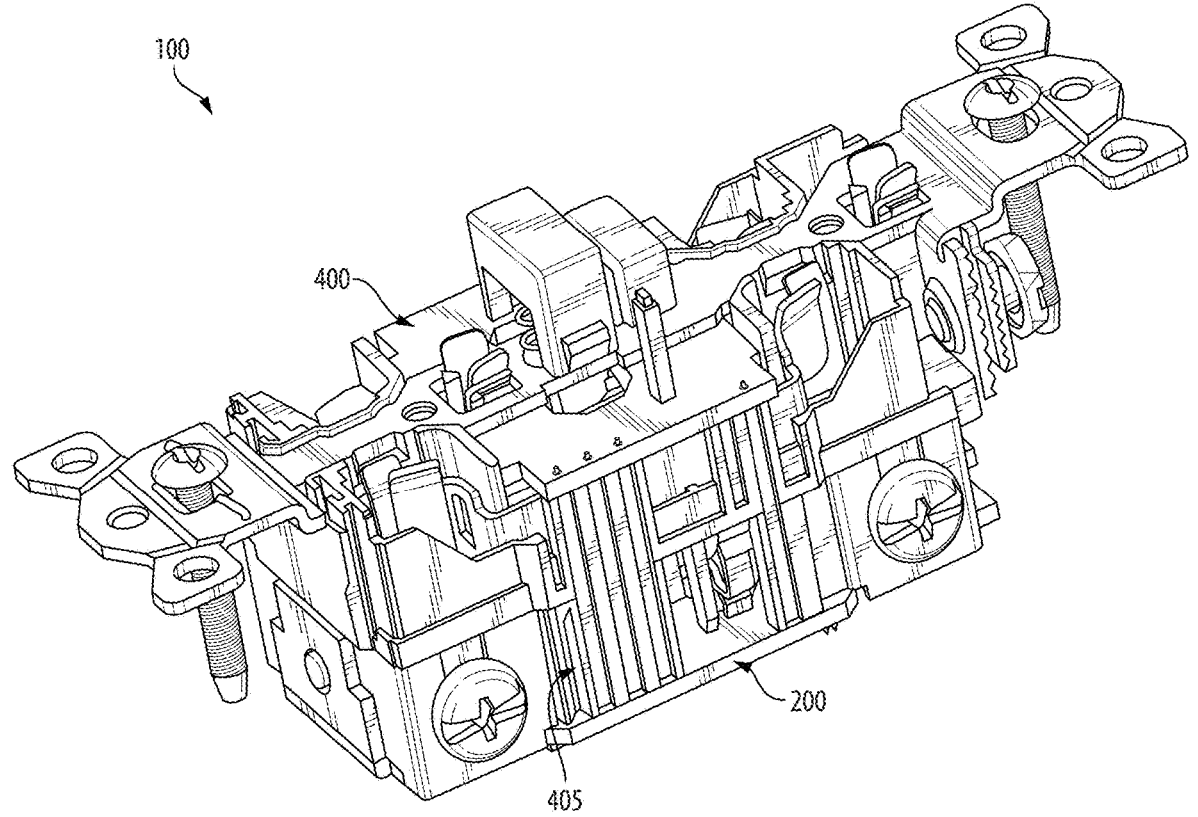
FIGS. 4A and 4B illustrate perspective views of the GFCI receptacle of FIG. 1 with a front cover removed to expose a secondary PCB, according to some embodiments.
Figure 4B:
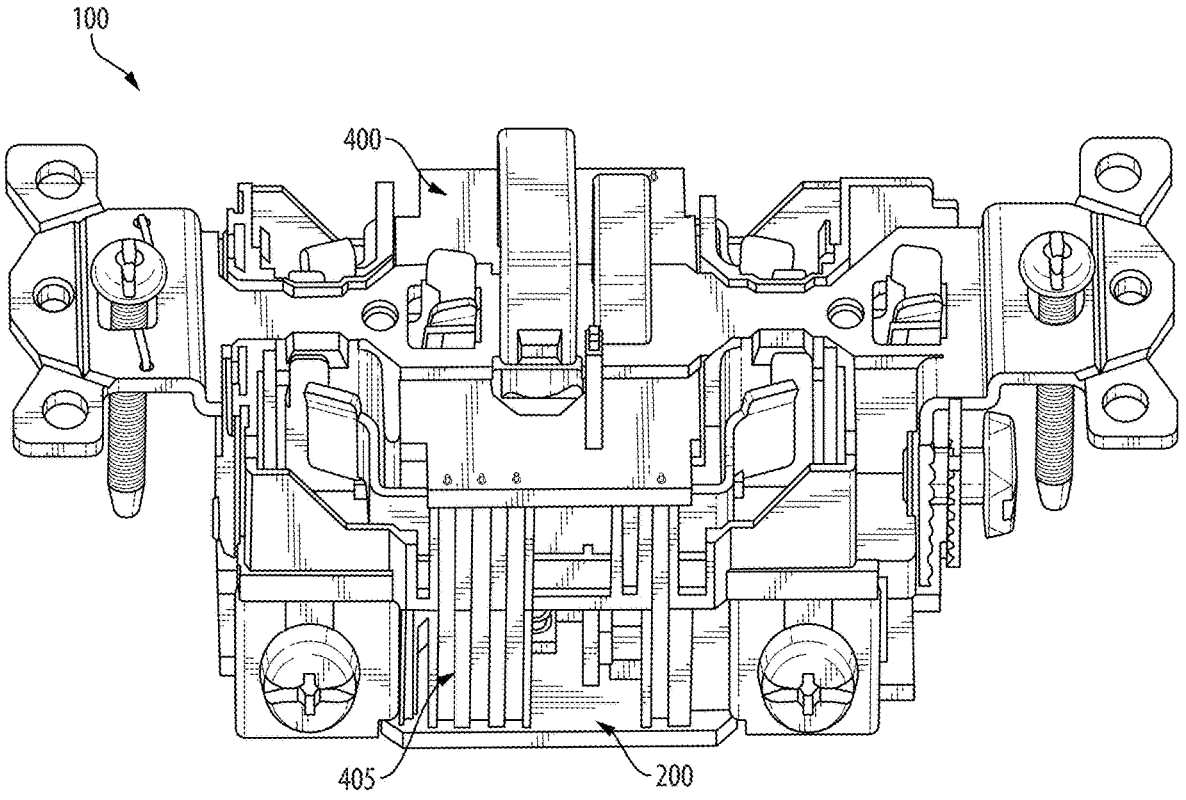
Figure 5:
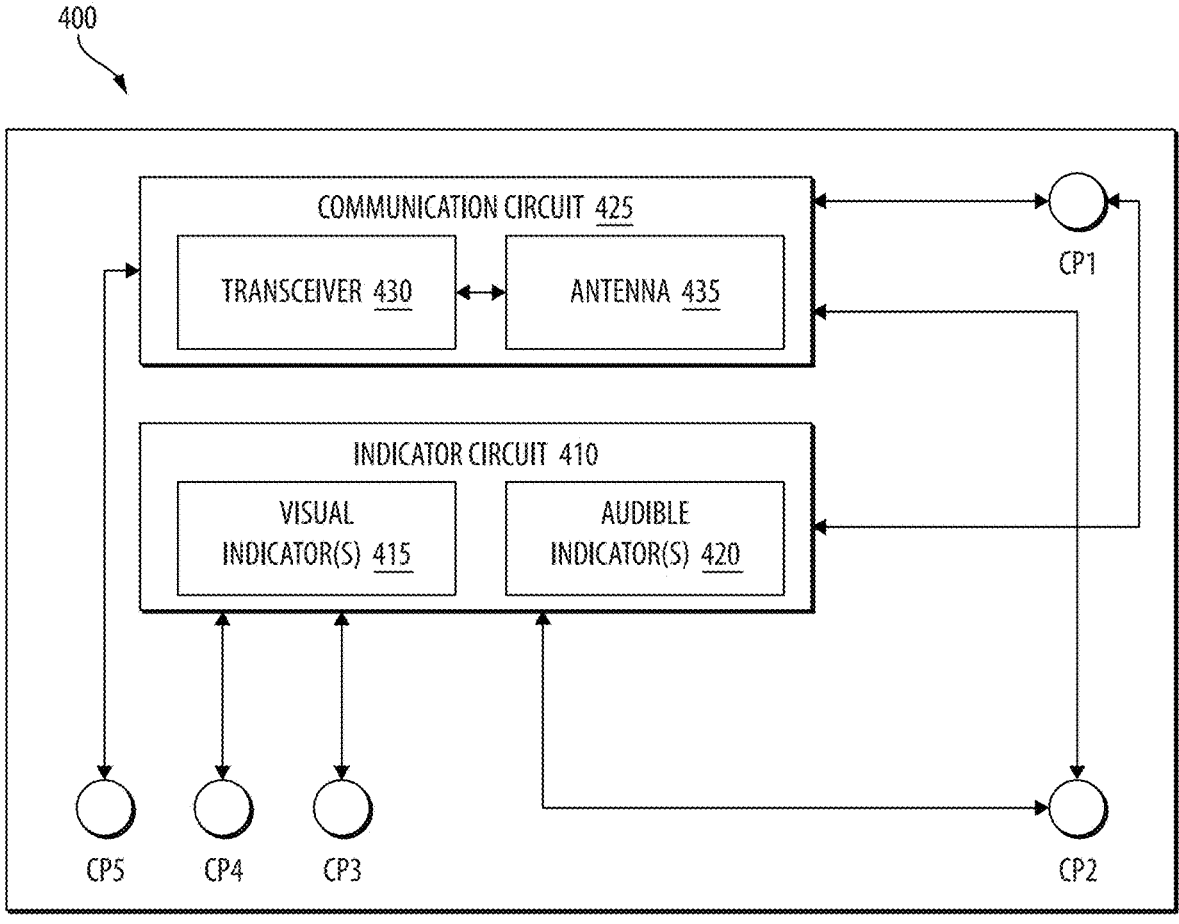
FIG. 5 illustrates a block diagram of a secondary printed circuit board (PCB) schematic diagram of a circuit of the GFCI receptacle of FIG. 1, according to some embodiments of the application.

FIGS. 4A and 4B illustrate perspective views of the GFCI
receptacle 100 in which the GFCI receptacle 100 includes a
secondary PCB, or secondary board, 400 according to some
embodiments. The secondary board 400 is physically sup-
ported within the GFCI receptacle 100 by a manifold 405,
which is physically supported by the primary board 200. In
some embodiments, the secondary board 400 is physically
supported by one or more fasteners, brackets, pins, and/or
equivalent mechanical component in addition to or in lieu of
the manifold 405. As shown in the block diagram of FIG. 5,
the secondary board 400 includes its own set of secondary
compliant pin ports, or compliant pins, CP1-CP5, which are
respectively configured to facilitate electrical connection
between the secondary board 400 and the primary board
200. For example, the secondary compliant pin CP1 is
configured to receive a wire that is electrically connected to
the primary compliant pin CP1 of the primary board 200,
thereby creating an electrical connection between the sec-
ondary compliant pin CP1 and the primary compliant pin
CP1. Likewise, the secondary compliant pins CP2-CP5 are
respectively configured to receive wires that are electrically
connected to the primary compliant pins CP2-CP5. In some
embodiments, the secondary compliant pins CP1-CP5 are
replaced with one or more conducting members that are
arranged to extend from the secondary board 400 and be
received by the primary pins CP1-CP5 of the primary board
200. In such embodiments, electrical connection between
the primary board 200 and secondary board 400 is achieved
without the use of additional wires. In some embodiments,
the secondary board 400 is electrically connected to the
primary board 200 via interface 315.

The secondary board 400 further includes, or otherwise
supports, one or more circuits that are configured to provide additional functionality to the GFCI receptacle 100. For
example, in some embodiments, the secondary board 400
includes an indicator circuit 410 that is configured to alert
nearby personnel to the status of GFCI receptacle 100. The
indicator circuit includes one or more visual indicators 415
(e.g., light emitting diodes (LEDs) and/or one or more
audible indicators 420 (e.g., speakers, buzzers, etc.) that are
operably coupled to the primary board 200, and in particular,
the microcontroller 310. In some embodiments, the indicator
circuit 410 receives power from the primary board 200 via
a power channel consisting of the primary compliant pin
CP2, the secondary compliant pin CP2, and a conductor
connected between the primary and secondary compliant
pins CP2, CP2. In some embodiments, other compliant pins
are used to transfer power between the primary and second-
ary boards 200, 400. In some embodiments, the indicator
circuit is powered by a power source included in the
secondary board 400.

In some embodiments, the one or more visual indicators
415 (e.g., one or more LEDs) are communicatively con-
nected to the microcontroller 310 via a first communication
channel. For example, the first communication channel
consists of the primary compliant pin CP3, the secondary
compliant pin CP3, and a conductor connected between the
primary and second compliant pins CP3, CP3. In such
embodiments, the microcontroller 310 is configured to acti-
vate, or enable power to flow to, the visual indicator(s) 415
in accordance with a first illumination state in response to
determining that no faults are present within the GFCI
receptacle 100. In such embodiments, the microcontroller
310 is further configured to activate the visual indicator(s)
415 in accordance with one or more additional illumination
states in response to determining that a fault is present within
the GFCI receptacle 100. In some embodiments, the one or
more visual indicators 415 are arranged on the secondary
board 400 such that the one or more visual indicators 415
align with and/or extend through the one or more additional
openings 155 formed in the outlet face 110.

Similarly, in some embodiments, the one or more audible
indicators 420 are communicatively coupled to the micro-
controller 310 via a second communication channel. For
example, the second communication channel consists of the
primary compliant pin CP4, the secondary compliant pin
CP4, and a conductor connected between the primary and
second compliant pins CP4, CP4. In such embodiments, the
microcontroller 310 is configured to activate, or enable
power to flow to, the one or more audible indicators 420
when the microcontroller 310 determines that a fault is
present within the GFCI receptacle 100. In some embodi-
ments, the microcontroller 310 is configured to activate both
the visual indicator(s) 415 and the audible indicator(s) 420
in response to detecting the presence of a fault within the
GFCI receptacle 100. In some embodiments, the microcon-
troller 310 is operatively connected to the visual indicator(s)
415 and the audible indicator(s) 420 via the same commu-
nication channel, such as the first communication channel or
the second communication channel.

In some embodiments, the secondary board 400 further
includes a communication circuit 425. In such embodiments,
the communication circuit 425 is configured to receive
power from the primary board 200 via the power channel
consisting of the primary compliant pin CP2, the secondary
compliant pin CP2, and a conductor connected between the
primary and secondary compliant pins CP2, CP2. In some
embodiments, the communication circuit 425 is powered by
a power channel consisting of other compliant pins or a
power source included in the secondary board 400. Furthermore, in some embodiments, the communication circuit 425 is operatively coupled to the microcontroller 310 via a third communication channel. That is, the microcontroller 310 is operable to transmit control signals to and receive serial data signals from the communication circuit 425 via the third communication channel. For example, the third communication channel consists of the primary compliant pin CP5, the secondary compliant pin CP5, and a conductor connected between the primary and secondary compliant pins CP5, CP5. In some embodiments, the communication circuit 425 is operatively coupled to the microcontroller by one or more additional communication channels.

The communication circuit 425 enables the GFCI receptacle 100 to communicate with one or more external devices (e.g., smartphones, tablets, computers, servers, etc.). For example, the communication circuit 425 enables the GFCI receptacle 100 to communicate with one or more devices connected to the internet of things (IoT). In some embodiments, the communication circuit 425 includes, among other things, a transceiver 430 that includes or is connected to an antenna 435. In some embodiments of the communication circuit 425, the transceiver 430 is replaced with either a transmitter and/or receiver. In some embodiments, the communication circuit 425 is configured to wirelessly communicate with one or more external devices using radio-frequency (RF) based communication. For example, in some embodiments, the transceiver 430 allows for short-range radio communication (e.g., Bluetooth®, WiFi, NFC, Zig-Bee, etc.) between the GFCI receptacle 100 and one or more external devices. In such embodiments, the transceiver 430 is operable to transmit signals to and receive signals from one or more external devices nearby the GFCI receptacle 100. In some embodiments, the transceiver 430 allows for long-range radio communication (e.g., cellular communication over a cellular network) between the GFCI receptacle 100 and one or more external devices. In some embodiments, the communication circuit 425 includes a transceiver that enables wired communication between the GFCI receptacle 100 and one or more external devices. In such embodiments, the communication circuit 425 communicates directly an external device using one or more signal lines.

In some embodiments, the transceiver 430 transmits one or more signals that include operating information (e.g., status, sensor values, etc.) associated with the GFCI receptacle 100. In such embodiments, the transceiver 430 is configured to transmit the signals periodically, intermittently, in response to the occurrence of an event, and/or on an on-demand basis. For example, the microcontroller 310 is configured to transmit, via the transceiver 430, the signal in response to detecting the occurrence of a fault. As another example, the transceiver 430 transmits a signal only when requested by an external device. In some embodiments, signals transmitted by the transceiver 430 include an identifier that identifies the GFCI receptacle 100 to which communication circuit 425 is connected. In some embodiments, the transceiver 430 is configured to receive one or more control signals from an external device. For example, an external device transmits a control signal that instructs the GFCI receptacle 100 to trip, or open, the circuit between line and load conductors. Accordingly, when the transceiver 430 receives the control signal, the microcontroller 310 is configured to activate solenoid 210. As described above, activation of the solenoid 210 causes electrical and physical separation of the line contacts 240, 245 from the load contacts 250, 255. As another example, an external device transmits a control signal that instructs the GFCI receptacle 310 to perform one or more self-tests. Accordingly, when the transceiver 430 receives the control signal, the microcontroller 310 is configured to perform the requested self-test. Furthermore, the microcontroller 310 is configured to transmit, via the transceiver 430, a signal that includes information associated with the results of the performed self-test(s) to the external device.

Although described and illustrated as being included on a single secondary board 400, it should be understood that, in some embodiments, the indicator circuit 410 and communication circuit 425 are included on separate PCBs. In some embodiments, the indicator circuit 410 and/or communication circuit 425 are included in the primary board 200. In some embodiments, functionality of the indicator circuit 410 and/or the communication circuit 425 are distributed across the secondary board 400, the primary board 200, and/or one or more additional PCBs. In some embodiments, the secondary board 400 includes one or more additional circuits. For example, the secondary board 400 includes one or more additional sensing (e.g., current sensing, voltage sensing, temperature sensing, etc.) circuits. As another example, the secondary board 400 includes a moisture sensing circuit, an arc fault circuit interrupter (AFCI) circuit, and/or a load detection circuit.

Figure 7:
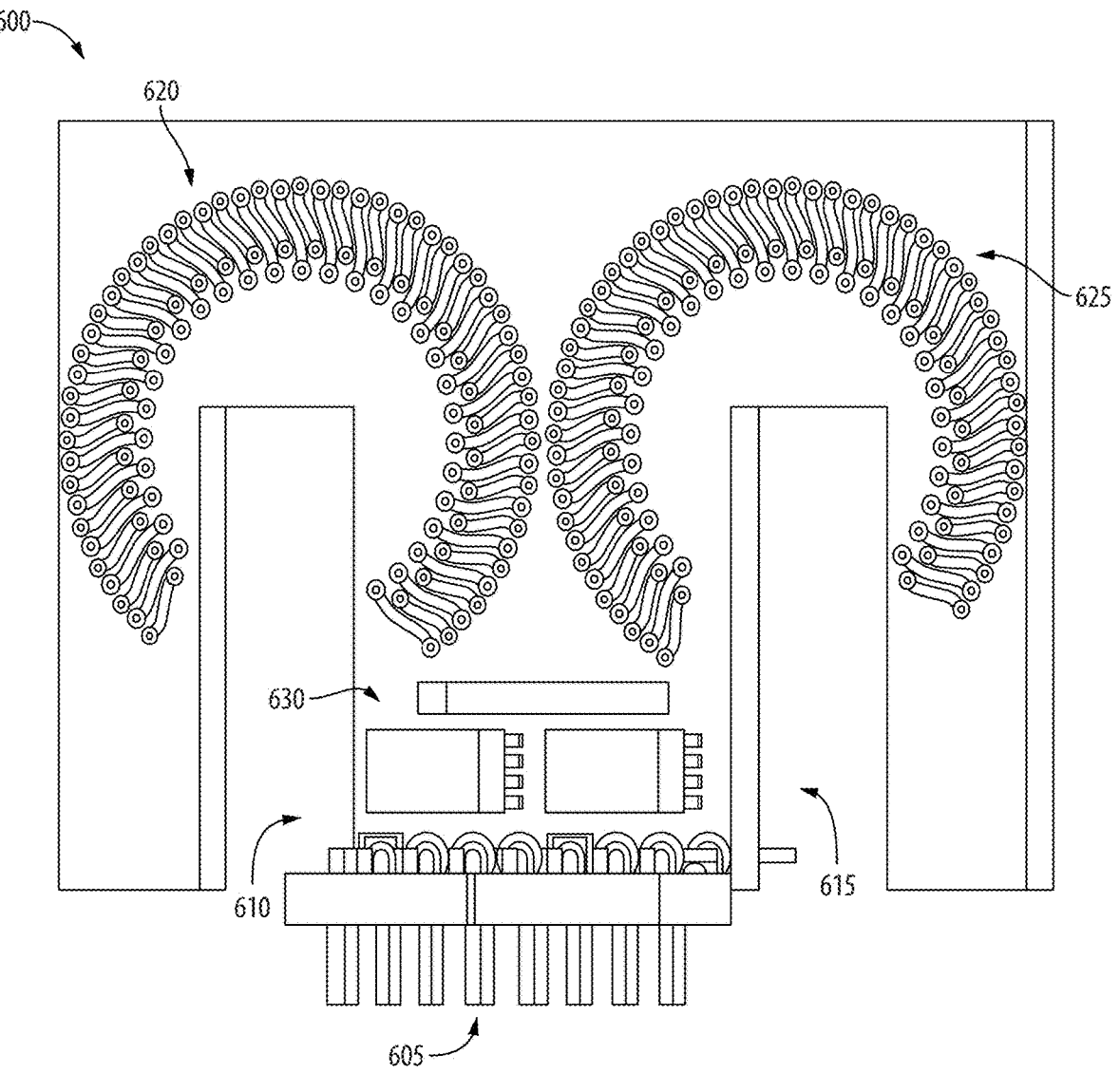
FIG. 7 is a perspective view of the third PCB of FIG. 6, according to some embodiments of the application.

FIG. 6 illustrates a perspective view of the GFCI receptacle 100 in which a third PCB, or third board, 600 connected to the primary board 200 is exposed. A block diagram of the third board 600 is illustrated in FIG. 7. As shown, the third board 600 includes one or more electrical pins 605 that extend outward and are arranged to be received by the ports of interface 315. When the pins 605 are received by the ports of interface 315, the pins 605 electrically and physically connect the third board 600 to primary board 200. In some embodiments, the pins 605 include one or more serial communication pins used for transferring data signals between the primary and third boards 200, 600. For example, the pins 605 includes one or more serial-peripheral interface (SPI) pins configured for linking communication between the primary board 200 and the third board 600. In some embodiments, the pins 605 further include one or more power pins used for transferring power between the primary and third boards 200, 600. In addition, first and second apertures 610, 615 are formed in the third board 600 and are respectively arranged to receive the line contact arms 220, 225. In some embodiments, the first aperture 610 is configured to receive the phase line contact arm 220, while the second aperture 615 is configured to receive the neutral line contact arm 225.

In some embodiments, the third board 600 is implemented as an AFCI module that includes one or more circuit components used for detecting the presence of an arc fault within the GFCI receptacle 100 and/or the circuit to which the GFCI receptacle 100 is connected. In such embodiments, as shown in FIG. 7, the third board includes first and second coils 620, 625. In some embodiments, the first and second coils 620, 625 are embedded in the third board 600 and respectively include first and second coil apertures. In some embodiments, the first coil aperture is configured to receive the phase line contact arm 220, whereas the second coil aperture is configured to receive the neutral line contact arm 225. In some embodiments, the first and second coils 620, 625 are implemented as Rogowski coils. In some embodiments, the first and second coils 620, 625 are implemented as other types of coils.

In some embodiments, the third board 600 further includes an arc fault detection circuit 630, which includes one or more electrical components used to detect the occurrence of an arc fault. For example, the arc fault detection circuit 630 includes a bandpass filter, an integrator, a gain stage, or scaling module, a resonator and/or a time-domain correlator. In some embodiments, the arc fault detection circuit 630 includes a microcontroller that is configured to control operation of the components included in arc fault detection circuit 630. In such embodiments, the arc fault detection circuit 630 is configured to perform a plurality of functions related to detecting the occurrence of an arc fault. The arc fault detection functions performed by the arc fault detection circuit 630 are similar to those described in U.S. Pat. No. 10,243,343, granted Mar. 26, 2019 and entitled "SYSTEMS AND METHOD FOR DETECTING AN IDENTIFYING ARCING BASED ON NUMERICAL ANALYSIS," the entire content of which is hereby incorporated by reference and reproduced in part below.

For example, in some embodiments, the microcontroller included in the arc fault detection circuit 630 is configured to analyze electrical signals output by the first coil 620 or electrical signals output by the first coil 620 and the second coil 625. Moreover, the microcontroller included in the arc fault detection circuit 630 is configured to determine whether an arc fault has occurred based on the analysis of electrical signals received from the first coil 620 or the first coil 620 and the second coil 625. In some embodiments, the microcontroller included in the arc fault detection circuit 630 is configured to transmit a signal, via one of the electrical pins 605, indicative of the occurrence of an arc fault to the microcontroller 310. In such embodiments, the microcontroller 310 is configured to trip the GFCI receptacle 100 in response to receiving the arc fault detection signal from the third board 600. In some embodiments, one of the electrical pins 605 is designated as an arc fault flag/status pin. In such embodiments, the microcontroller included in the arc fault detection circuit 630 is configured to set the voltage of the flag pin to a first, or high, value when an arc fault has been detected. Further, in such embodiments, the arc fault detection circuit 630 is configured to set the voltage of the flag pin to a second, or low, value when an arc fault has not been detected. In some embodiments, the one or more of the electrical pins 605 include a serial peripheral interface over which the arc fault flag status is conveyed to the microcontroller 310. In some embodiments, the microcontroller included in the arc fault detection circuit 630 is configured to receive a signal indicative of the line voltage zero-crossing detection from the microcontroller 310 included in the primary board 200.

In some embodiments, the microcontroller included in the arc fault detection circuit 630 is further configured to perform an AFCI self-test. In such embodiments, the microcontroller 630 is configured to report the results of the AFCI self-test to the microcontroller 310. In some embodiments, the microcontroller included in the arc fault detection circuit 630 is configured to perform the AFCI self-test periodically, intermittently, and/or on an on-demand basis. In some embodiments, the AFCI self-test is performed in response to receiving an instruction from the microcontroller 310.

Although the circuit components included in the AFCI module are described as being embedded in, or otherwise supported, by the third board 600, it should be understood that in some embodiments, some or all of the electrical components of the third board 600 are moved to the primary board 200 and/or additional PCBs. For example, in some embodiments, the arc fault detection circuit 630 is included as a function block of the microcontroller 310. In such embodiments, electrical signals are provided from the first and second coils 620, 625 to the microcontroller 310, which is configured to determine whether an arc fault has occurred based on the received signals. As another example, in some embodiments, the functionality provided by the first and second coils 620, 625 is respectively performed by sense and grounded neutral transformers (FIG. 8) attached to the primary board 200. Accordingly, in such embodiments, a third board 600 without embedded coils is used in conjunction with the sense and grounded neutral transformers to detect the occurrence of an arc fault.

Figure 8A:
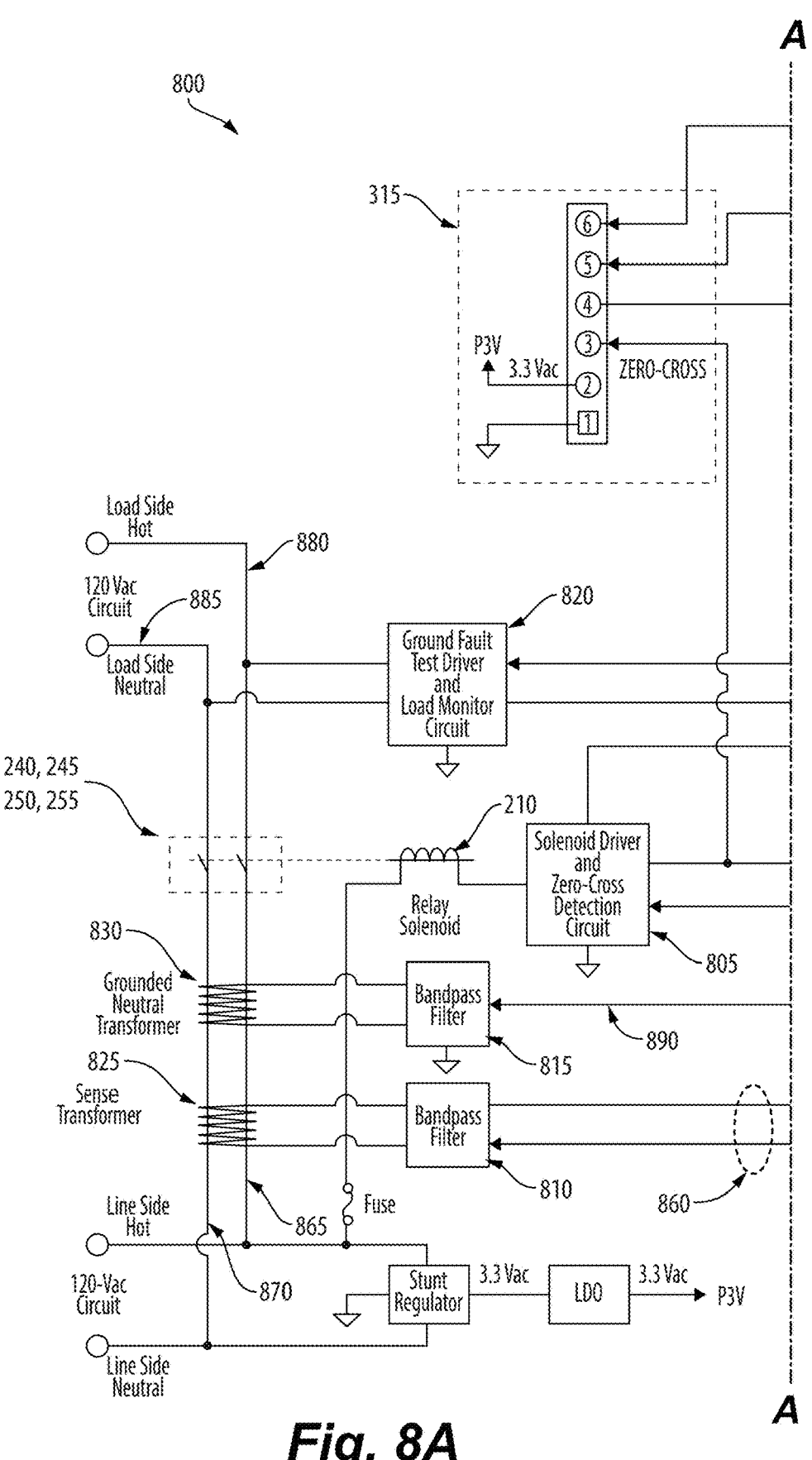
FIGS. 8A-8B illustrate a block diagram of a control system of the GFCI receptacle of FIG. 1, according to some embodiments of the application.
Figure 8B:
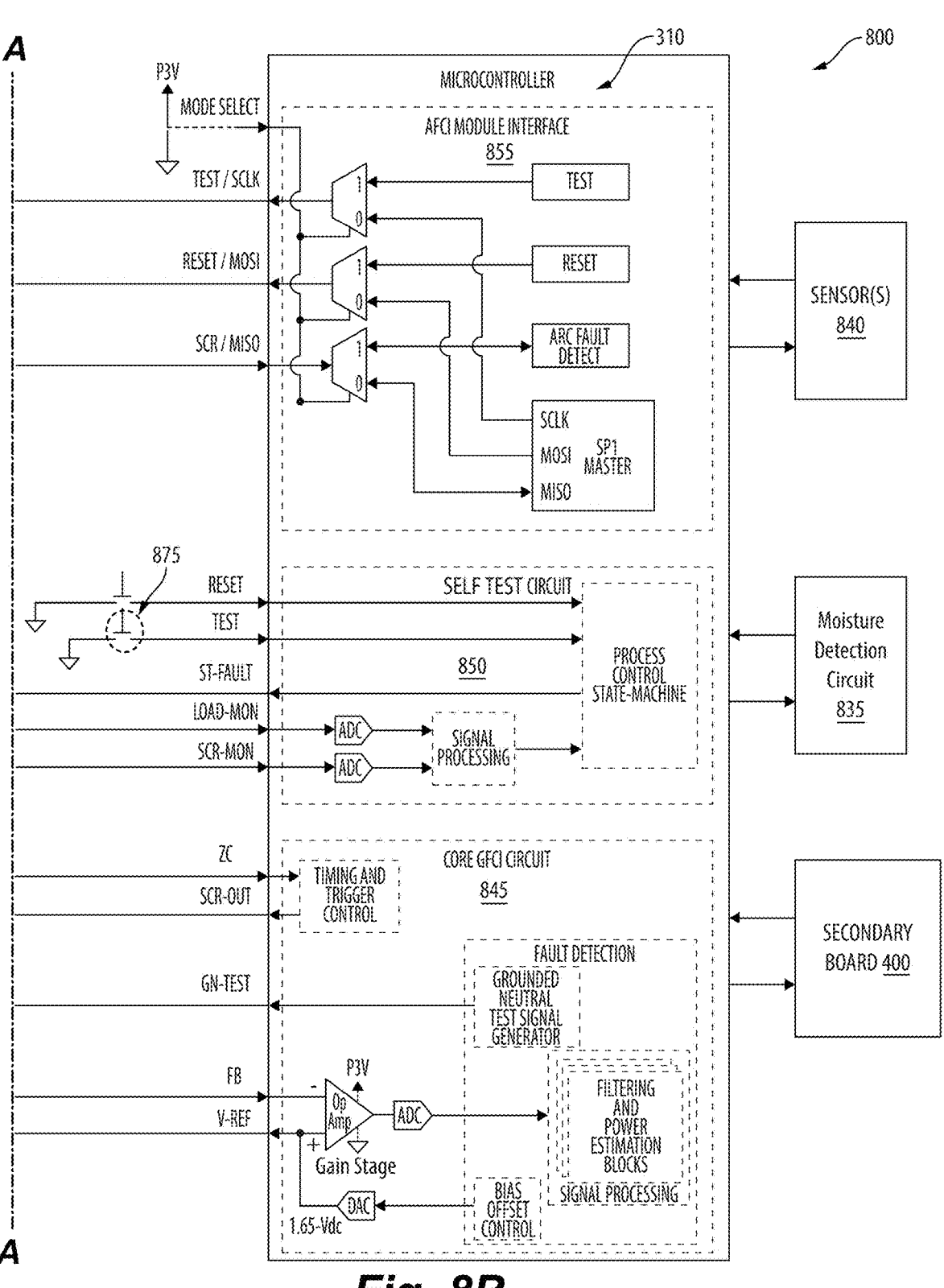
Figure 9A:
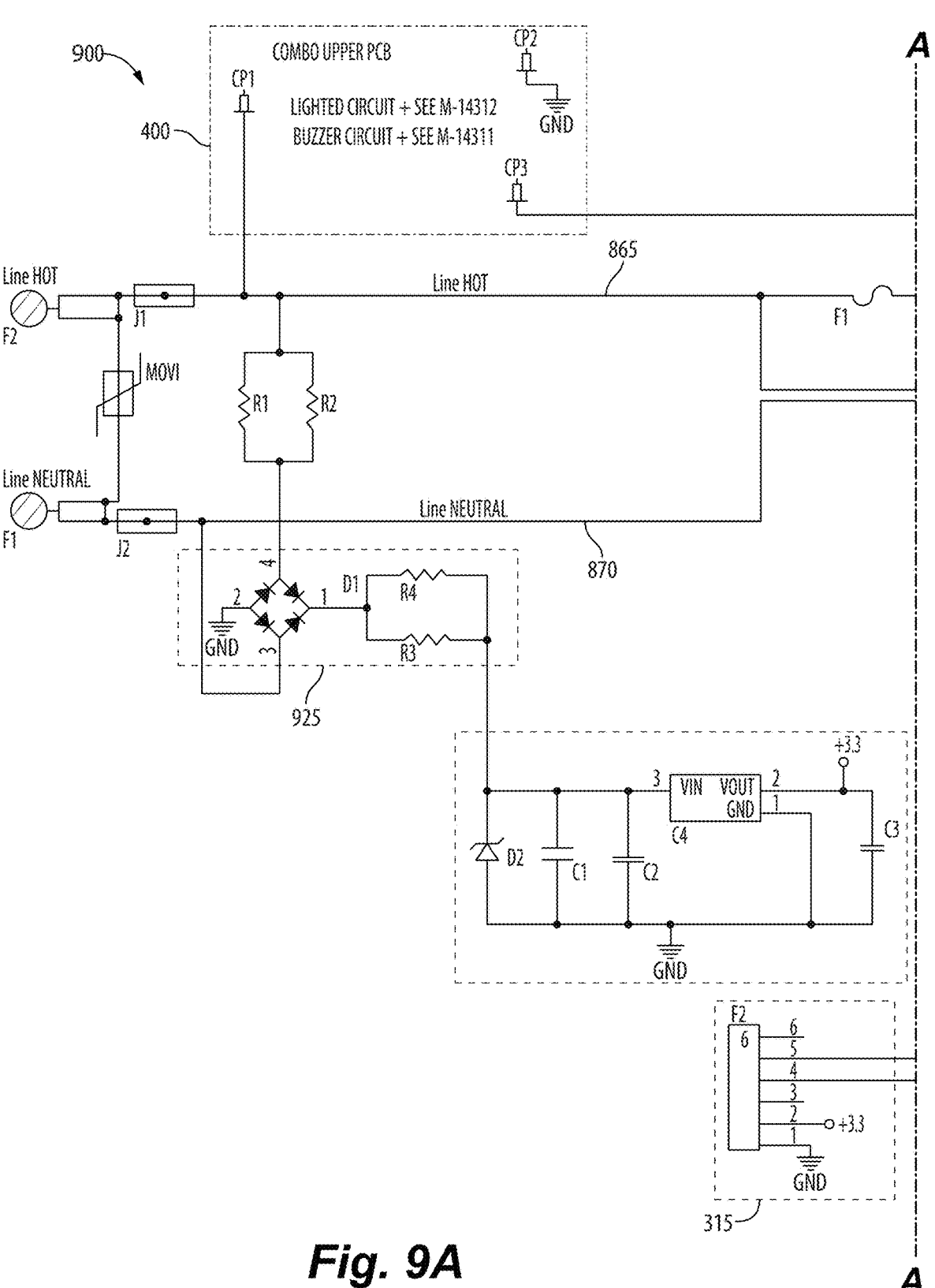
FIGS. 9A-9C illustrate a circuit schematic of the control system of FIGS. 8A-8B, according to some embodiments of the application.
Figure 9B:
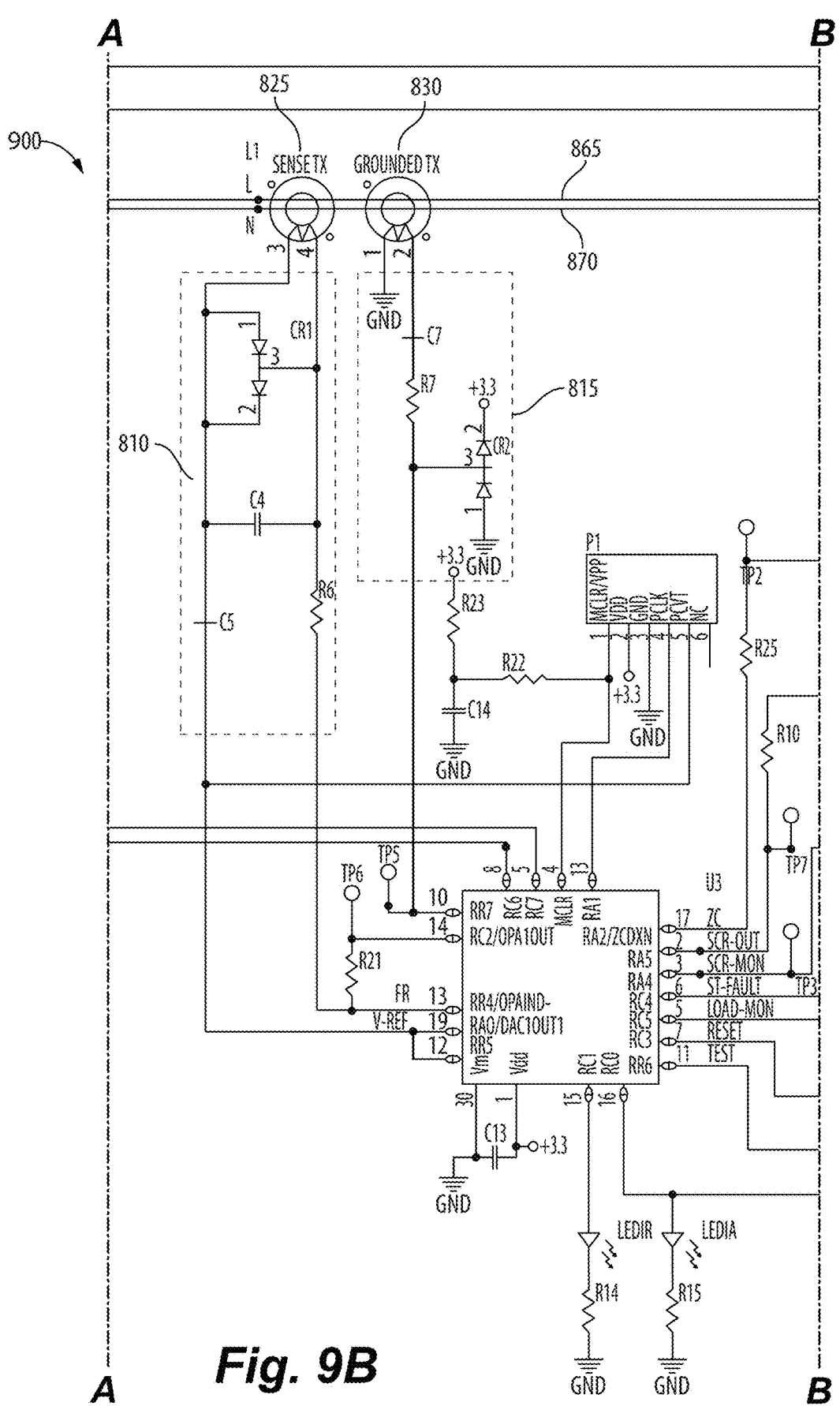
Figure 9C:
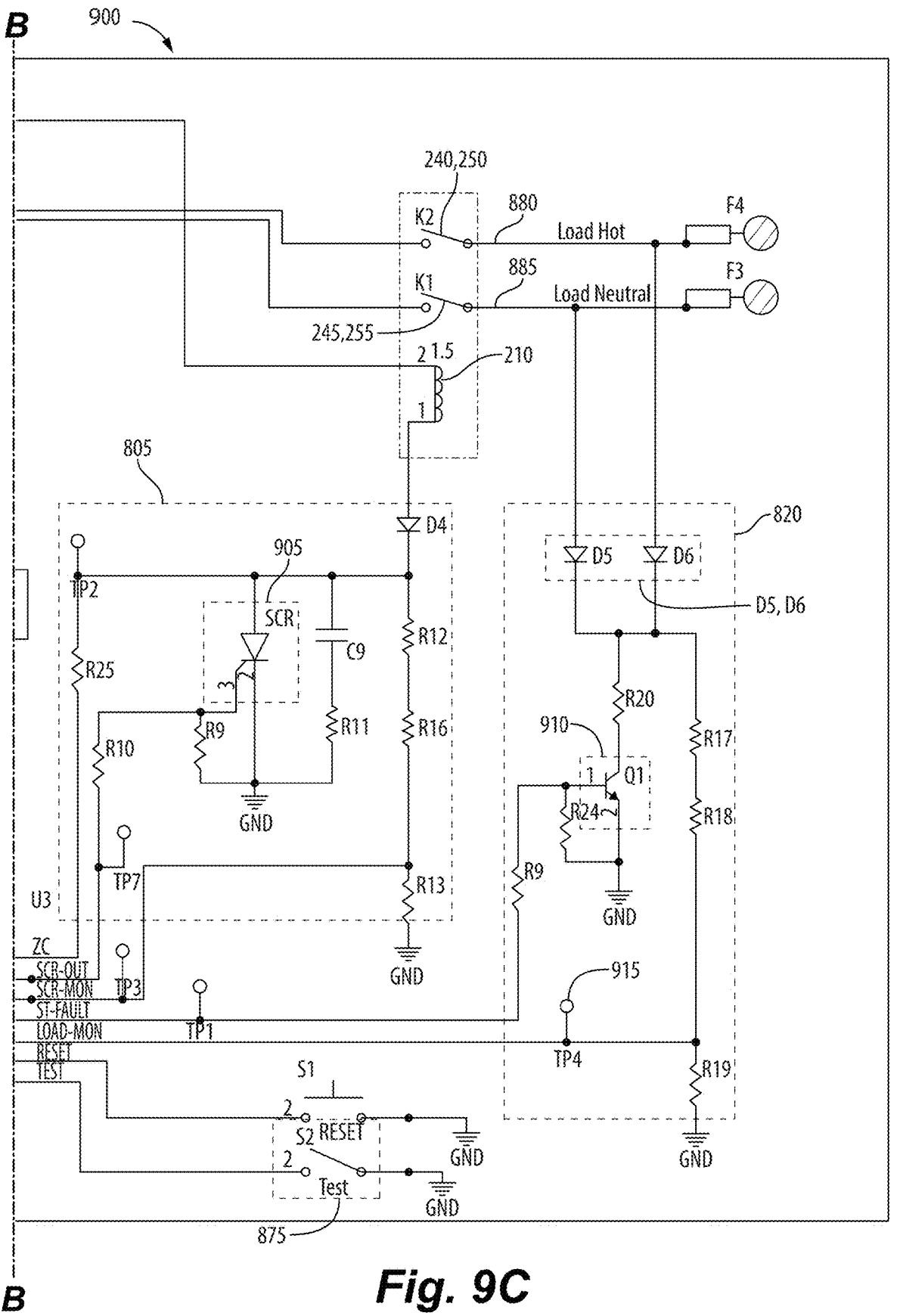

FIGS. 8A-8B illustrate a block diagram of a control system 800 of the GFCI receptacle 100. When FIGS. 8A and 8B are joined along match-line A-A, the complete block diagram of control system 800 is shown. FIGS. 9A-9C illustrate a circuit schematic 900 of the control system 800. When FIGS. 9A and 9B are joined along match-line A-A and when FIGS. 9B and 9C are joined along match-line B-B, the complete circuit schematic 900 is shown.

As shown, the control system 800 includes the microcontroller 310. As described above, the microcontroller 310 is electrically and/or communicatively connected to a variety of modules and/or components of the GFCI receptacle 100. For example, the microcontroller 310 is connected to the secondary board 400, the third board 600 (e.g., via the interface 315), a solenoid driver and zero-cross detection circuit 805, a first bandpass filter 810, a second bandpass filter 815, a ground fault test driver and load monitor circuit 820, a sense transformer 825, a grounded neutral transformer 830, a moisture detection circuit 835, and one or more additional sensors 840 (e.g., voltage sensors, current sensors, temperature sensors, etc.). In some embodiments, the sense transformer 825 and grounded neutral transformer 830 are implemented as the first and second coils 620, 625 embedded in the third board 600. That is, in some embodiments, the first and second coils 620, 625 embedded in the third board 600 are operable to perform the same functions that sense transformer 825 and grounded neutral transformer 830 perform. Accordingly, in such embodiments, there is no need for additional sense and grounded neutral transformers 825, 830.

As described above, the microcontroller 310 is a Microchip microcontroller, such as the PIC18F, that includes a plurality of electrical and electronic components that provide power, operational control, and protection to the components and modules within the microcontroller 310 and GFCI receptacle 100. For example, the microcontroller 310 includes, among other things, a memory (not explicitly shown or enumerated) and an electronic processor. The memory includes, for example, a program storage area and a data storage area. The program storage area and the data storage area can include combinations of different types of memory, such as read-only memory (ROM) and random access memory (RAM). Various non-transitory computer readable media, for example, magnetic, optical, physical, or electronic memory may be used.

The electronic processor is communicatively coupled to the memory and executes software instructions that are stored in the memory, or stored in another non-transitory computer readable medium such as another memory or a disc. The software may include one or more applications, program data, filters, rules, one or more program modules, and other executable instructions and routines. In some embodiments, the functionality and/or operation of the electronic processor is distributed across one or more functional blocks included in the microcontroller 310. For example, as shown in FIG. 8B, the microcontroller includes a GFCI function block 845, a self-test function block 850, and AFCI function block 855. In some embodiments, the microcontroller 310 includes fewer function blocks than what is illustrated in FIG. 8B. For example, in some embodiments, some of the function blocks of microcontroller 310 are combined into a single function block. In some embodiments, the microcontroller 310 includes additional function blocks that are not illustrated in FIG. 8B.

During operation of the GFCI receptacle 100, the microcontroller 310 is configured to execute a main ground fault detection routine and one or more additional self-test, monitoring, and/or communication subroutines simultaneously. In some embodiments, the microcontroller 310 executes the main ground fault detection routine, a grounded neutral detection subroutine, and the one or more additional self-test subroutines simultaneously. For example, the GFCI function block 845 is configured execute the main ground fault detection routine and grounded neutral detection subroutine while the self-test function block 850 executes one or more self-test subroutines. As shown in the block diagram of FIG. 10, the microcontroller 310 is configured to execute the main ground fault detection routine, a grounded neutral detection subroutine, a frequency determination subroutine, a ground fault self-test subroutine, a solenoid self-test subroutine, a welded contact self-test subroutine, an end of life (EOL) self-test subroutine, a communications subroutine, and a system initialization subroutine. In some embodiments, the microcontroller 310 is configured to execute additional subroutines that are not illustrated in FIG. 10. Further, as will be described in more detail below, the microcontroller 310 is configured to execute any one of the self-test subroutines periodically, intermittently, and/or on-demand. For example, a user of an external device that is in wireless communication with the communication circuit 425 of the GFCI receptacle 100 is operable to wirelessly, or remotely, command the microcontroller 310 to perform a desired self-test.

Main Ground Fault Detection Routine

During operation of the GFCI receptacle 100, the microcontroller 310 is configured to receive electrical signals from various components included in the GFCI control system 800. For example, the GFCI function block 845 of microcontroller 310 is configured to sense the signal, FB, induced on conductor 860 and provided to input pin RB4 of the microcontroller 310. The conductor 860 is wound around the sense transformer 825, with respective ends of conductor 860 being connected to output pin RB5 and input pin RB4 of microcontroller 310 (FIG. 9). In some embodiments, the signal FB induced on conductor 860 is filtered by a first bandpass filter 810 before being provided to the input pin RB4. For example, with respect to FIG. 8B, the signal FB induced on conductor 860 is provided as an input to a single ended op-amp included in the GFCI function block 845. Accordingly, the first bandpass filter 810 is configured to implement a high-pass function and offset the bias of signal FB that may otherwise affect operation of the op-amp. In some embodiments, the first bandpass filter 810 is further configured to implement a low-pass function to prevent aliasing in the output of the A/D converter included in the GFCI function block 845.

As shown in FIG. 8A, the line side phase and neutral conductors 865, 870 extend through a first aperture formed in the sense transformer 825 and a second aperture formed in the grounded neutral transformer 830. When there is a current imbalance between the line side conductors 865, 870, a net current flows through the transformers 825, 830. Net current flowing through the transformers 825, 830 causes a magnetic flux to be generated about at least the sense transformer 825, thereby inducing a current on the conductor 860. That is, when there is a difference between the current flowing through the line side phase conductor 865 and the current flowing through the line side neutral conductor 870, a current is induced on the conductor 860. The induced current on conductor 860 causes a voltage difference between the signal FB provided to input pin RB4 and the reference signal V-REF output by pin RB5. The voltage difference between the two signals is detectable by the microcontroller GFCI function block 845.

In some embodiments, a component of the microcontroller 310, such as the GFCI function block 845, is configured to adjust, or compensate, the signal FB and/or the reference signal V-REF such that the sampled signal FB and/or the reference signal V-REF have a degree of accuracy that is within an acceptable, or target, range. In some embodiments, the target accuracy range determined in accordance with standards, such as UL-943, established by the Underwriter's Laboratory (UL) in conjunction with industry-leading manufacturers and safety groups. In some embodiments, the microcontroller 310 is configured to compensate the signal FB and/or the reference signal V-REF with respect to a temperature, such as an internal temperature of the microcontroller 310 or a temperature external to the microcontroller 310. In such embodiments, when compensated with respect to temperature, the compensated signal FB is corrected to have an accuracy within the target range. In some embodiments, the temperature is measured using one or more of the sensors 840 included in microcontroller 310. In some embodiments, the temperature is measured by one or more components of the secondary board 400. In some embodiments, the microcontroller 310 is configured to compensate the signal FB and/or the reference signal V-REF with respect to a signal other than a temperature signal. In some embodiments, compensating the signal FB includes adjusting a frequency of the signal FB based on the measured temperature. In some embodiments, compensating the signal FB includes adjusting a voltage of the signal FB based on the measured temperature.

While executing the main ground fault detection routine, the GFCI function block 845 is configured to determine whether the voltage difference between the FB and V-REF signals exceeds a fault threshold. A value of the fault threshold is selected to be one that is indicative of the occurrence of a ground fault within the GFCI receptacle 100. In some embodiments, the fault threshold is a non-zero voltage value that is determined in accordance with standards, such as UL-943, established by the Underwriter's Laboratory (UL) in conjunction with industry-leading manufacturers and safety groups. In some embodiments, the fault threshold is configurable voltage value that is set by a user of an external device configured to wirelessly communicate with the GFCI receptacle 100. When the GFCI function block 845 determines that the voltage difference between the V-REF and FB signals exceeds the fault threshold, the GFCI function block 845 is configured to output a control signal SCR-OUT from output pin RA5 of microcontroller 310 to the solenoid driver and zero-cross detection circuit 805.

The control signal, SCR-OUT, is used to control a solenoid switch 905 included in the solenoid drive and zero-cross detection circuit 805. In some embodiments, the solenoid switch 905 is a silicon controlled rectifier (SCR) switch having a gate, an anode, and a cathode. In such an embodiment, the control signal is received at the gate of the solenoid switch 905. When the control signal is received at the gate of the solenoid switch 905, the solenoid switch 905 is activated and current is allowed to flow between the anode and the cathode of the solenoid switch 905. When the solenoid switch 905 is activated, current flows from line side phase conductor 865 through the solenoid 210. As current flows through solenoid 210, a magnetic field is generated that moves an armature within solenoid 210. When the solenoid armature moves, contact carriage 260 (FIG. 15) is unlatched and the line side contacts 240, 245 become physically and electrically separated from the load side contacts 250, 255. While the line side contacts 240, 245 are physically and electrically separated from the load side contacts 250, 255, the load side conductors 880, 885 do not carry current and the GFCI receptacle 100 is in a tripped condition. While in the tripped condition, the GFCI receptacle 100 will not deliver power to a load until the GFCI receptacle 100 is reset. Accordingly, the microcontroller 310, and more particularly the GFCI function block 845, is configured to detect the presence of a ground fault and trip the GFCI receptacle 100 in response to determining that a ground fault is present.

As described above, the GFCI function block 845 is configured to trip, or open the circuit included in, the GFCI receptacle 100 in response to detecting an imbalance in current between the line side conductors 865, 870. However, the presence of current imbalance between the line side conductors 865, 870 does not necessarily mean that a real ground fault has occurred within the GFCI receptacle 100. For example, the current imbalance between line side conductors 865, 870 may result from either a real ground fault, a simulated ground fault, or a self-test ground fault. A simulated ground fault is generated when test switch 875 closes, which occurs when TEST button 145 (FIG. 1) is pressed. As described in further detail below, a self-test ground fault occurs when the self-test function block 850 performs a ground fault self-test. Thus, it may be undesirable to trip the GFCI receptacle 100 when the current imbalance is caused by a self-test ground fault. Accordingly, in some embodiments, the microcontroller 310 is configured to determine whether a detected current imbalance has been caused by a self-test before outputting the control signal SCR-OUT from pin RA5. In some embodiments, the microcontroller 310 is further configured to transmit, by the communication circuit 425, a signal indicating the occurrence of a ground fault and/or a successful trip to an external device after tripping the GFCI receptacle 100.

Figure 11:
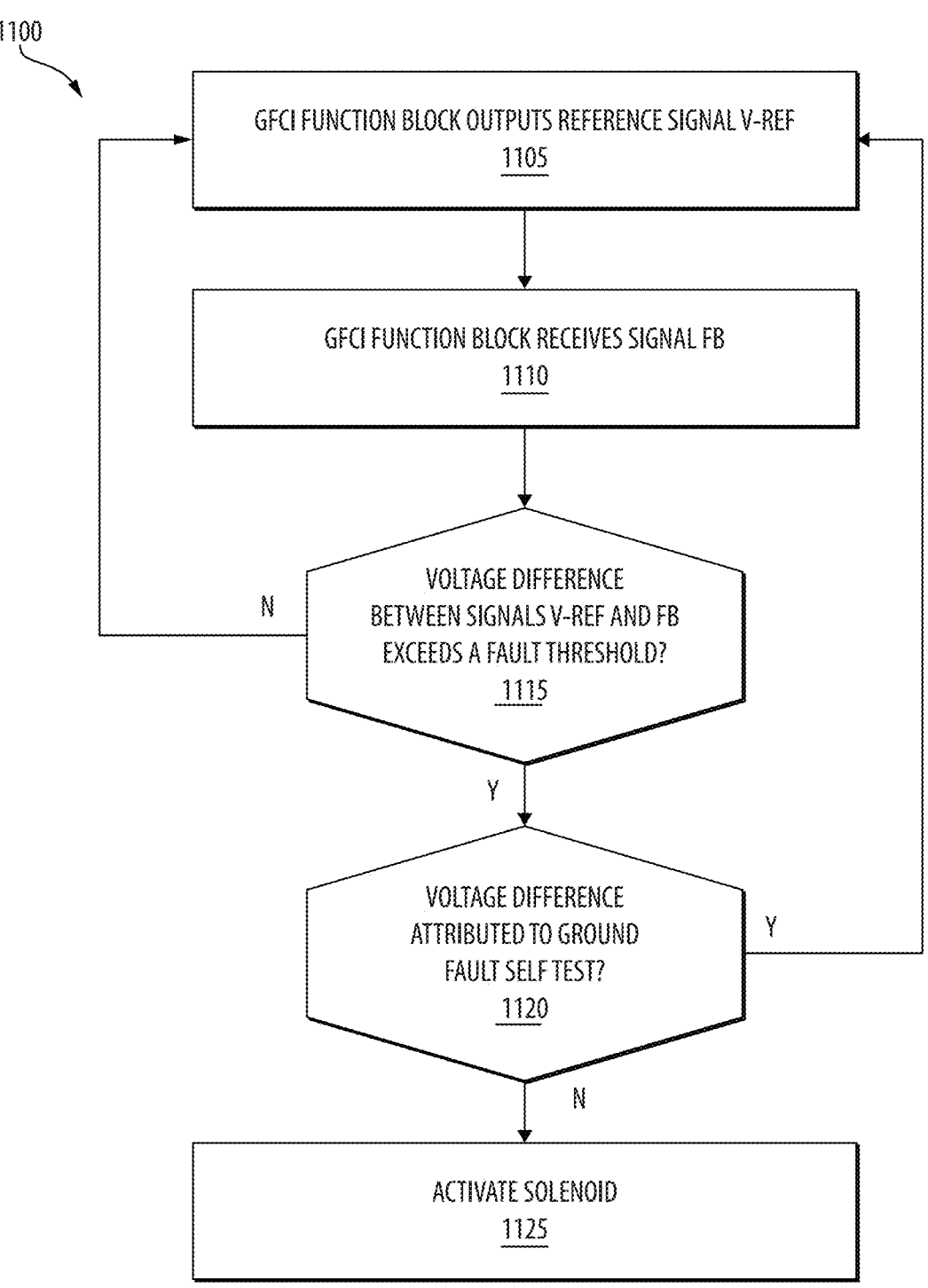
FIG. 11 is a flow chart illustrating a ground fault detection routine executed by the control system of FIGS. 8A-8B, according to some embodiments of the application.

FIG. 11 is a flow chart illustrating a main ground fault detection process, or method, 1100 performed by microcontroller 310 in accordance with some embodiments of the present disclosure. Although illustrated as occurring sequentially, some of the steps included in process 1100 are performed in parallel. Furthermore, it should be understood that in some embodiments, additional steps are added to the process 1100. The microcontroller 310, and more particularly the GFCI function block 845, outputs a reference voltage signal V-REF from output pin RB5 (Block 1105). The GFCI function block 845 receives a signal FB, which is induced on conductor 860 and indicative of current imbalance between line side conductors 865 and 870, at input pin RD4 (Block 1110). The GFCI function block 845 determines whether a voltage difference between signals V-REF and FB exceeds a fault threshold (Block 1115). In some embodiments, Block 1115 includes determining whether a voltage difference between signals V-REF and FB includes compensating the signals V-REF and FB with respect to a temperature (e.g., an internal temperature of the microcontroller 310), as described above, before determining the difference between signal V-REF and FB. When the GFCI function block 845 determines that the voltage difference does not exceed the fault threshold, the process 1100 returns to Block

1105. When the GFCI function block 845 determines that the voltage difference exceeds the fault threshold, the GFCI function block determines whether the voltage difference is attributed to a self-test performed by microcontroller 310 (Block 1120). When the GFCI function block 845 determines that the voltage difference is attributed to a self-test performed by microcontroller 310, the process 1100 returns to Block 1105. When the GFCI function block 845 determines that the voltage difference is not attributed to a self-test performed by microcontroller 310, the GFCI function block 845 activates the solenoid 210, thereby tripping the GFCI receptacle 100 (Block 1125).

Grounded Neutral Test

The microcontroller 310, and more particularly the GFCI function block 845, is further configured to perform a grounded neutral test. For example, the GFCI function block 845 performs the grounded neutral test by executing the grounded neutral detection subroutine. The grounded neutral test is performed by the GFCI function block 845 to determine whether a grounded neutral condition is present on the load side of the GFCI receptacle 100. In some embodiments, the GFCI function block 845 is configured to perform the grounded neutral test within a predetermined amount of time of the GFCI receptacle 100 receiving power (e.g., approximately five seconds). In some embodiments, the GFCI function block 845 is configured to perform the grounded neutral test at a random time within a predetermined time range after the GFCI function block 845 receives. For example, the GFCI function block 845 is configured to perform the grounded neutral test at a random time within one minute of the GFCI receptacle 100 receiving power. As another example, the GFCI function block 845 is configured to perform the grounded neutral test at a random time within one hour of the GFCI receptacle 100 receiving power. In some embodiments, when a plurality of GFCI receptacles 100 are connected to the same circuit (e.g., building wiring infrastructure), the random timing described above provides for asynchronous grounded neutral testing among the plurality of GFCI receptacles. In some embodiments, the GFCI function block 845 is configured to perform the grounded neutral test periodically, or at predetermined time intervals (e.g., once every minute, once every hour, once every day, etc.).

In some embodiments, the GFCI function block 845 is configured to perform the grounded neutral test intermittently or at random times. In some embodiments, the GFCI function block 845 is configured to perform the ground neutral detection subroutine and the main ground fault detection routine simultaneously. In some embodiments, the GFCI function block 845 is configured to perform the grounded neutral detection subroutine after frequency of the input voltage has been determined. In some embodiments, the GFCI function block 845 is configured to perform the grounded neutral detection subroutine in response to receiving a control signal from an external device.

While executing the grounded neutral detection subroutine, the GFCI function block 845 applies a grounded neutral signal GN-TEST to a conductor 890. The grounded neutral signal GN-TEST is a periodic signal (e.g., a pulse-width modulated signal, a square wave signal, or sine wave signal, etc.) output from pin RB7 onto conductor 890. In some embodiments, the GFCI function block 845 is configured to adjust the grounded neutral signal GN-TEST to compensate for operating conditions that may adversely affect eh performance of analog circuitry included in the control system 800.

For example, with respect to FIGS. 8 and 9, the grounded neutral transformer 830 and the capacitor C7 included in the second bandpass filter 815 form a tank-circuit for which, in some instances, the resonant peak frequency may drift with changes in temperature. In such instances, the frequency on a first side of the resonant peak frequency may shifted by 90 degrees relative to the frequency on a second side of the resonant peak frequency. Thus, in such an example, the GFCI function block 845 is configured to adjust the stimulus frequency of the grounded neutral signal GN-TEST to be offset form the resonant peak frequency, thereby avoiding the undesirable effects that would be caused by such a phase-shift condition. Furthermore, since the maximum energy transfer will occur at the resonant peak, the stimulus created in the grounded neutral transformer 830 by the grounded neutral signal GN-TEST will be attenuated as the offset of the stimulus frequency from the resonant peak increase, and thus, the grounded neutral detection sensitivity may decrease as a result. Accordingly, the GFCI function block 845 is further configured to adjust the stimulus frequency of the grounded neutral signal GN-TEST to temperature compensate both the grounded neutral detection sensitivity and to prevent a 90 degree phase shift in the grounded neutral transformer 830.

In another example with respect to FIGS. 8 and 9, the sense transformer 825 may become saturated by large, peak load currents passing through it. Saturation of the sense transformer 825 may result in a phase inversion of the signal FB. Thus, to mitigate this undesirable effect, the GFCIE function block 845 preferably generates the grounded neutral signal GN-TEST near a rising or falling edge in the line voltage as opposed to near the peak of the line voltage. That is, in some embodiments, the grounded neutral signal GN-TEST is adaptively applied to the conductor 890 based on a quadrant (e.g., a rising or falling edge in a sine wave) of the mains power signal applied to the line-side of the GFCI receptacle 100.

In some embodiments, the grounded neutral signal GN-TEST is adaptively applied to the conductor 890 based on a phase of the mains power signal applied to the line-side of GFCI receptacle 100. In some embodiments, the grounded neutral signal GN-TEST is adaptively applied to the conductor 890 based on one or more of a temperature signal (e.g., an internal temperature of the microcontroller 310), a wave shape of the mains power applied to the line side of the GFCI receptacle 100, a power factor measured by the microcontroller 310, and/or some other dynamic electrical characteristic of the GFCI receptacle 100. In some embodiments, the grounded neutral signal GN-TEST is output to generate a resonant condition within the grounded neutral transformer 830.

As shown, the conductor 890 is wound around the core of grounded neutral transformer 830. When a grounded neutral condition is present within the GFCI receptacle 100, application of the grounded neutral signal GN-TEST on conductor 890 can be detected by monitoring the sense transformer signal FB induced on conductor 860. For example, while a grounded neutral condition is present within the GFCI receptacle 100, current is bypassed from the load side neutral conductor 885 to the line side neutral conductor 870 such that fault current does not have a return path through the sense transformer 825. Thus, the grounded neutral signal GN-TEST is applied to the conductor 890 to induce a detectable current imbalance between the line side conductors 865, 870. As described above, GFCI function block 845 is configured to detect the current imbalance between line side conductors 865, 870 by comparing the voltage values of signals FB and V-REF. When the GFCI function block 845 determines that the voltage difference between signals FB and V-REF exceeds a fault threshold after outputting the grounded neutral signal GN-TEST, the GFCI function block 845 is configured to determine that a grounded neutral condition is present, or has occurred, within the GFCI receptacle 100. In some embodiments, the frequency at which the GFCI function block 845 performs the grounded neutral test (e.g., applies the ground neutral signal GN-TEST to conductor 890) is synchronized with the rate at which the GFCI function block 845 samples the signal FB induced on conductor 860. For example, in some embodiments, the rate at which the GFCI function block 845 performs that grounded neutral test is a multiple of the rate at which signal FB is sampled. In some embodiments, the rate at which the GFCI function block 845 performs the ground neutral test is less frequent than the rate at which the rate at which the GFCI function block 845 samples the signal FB. In some embodiments, the GFCI function block 845 samples the signal FB using equivalent or real-time sampling, and thus, in such embodiments, the GFCI function block 845 performs the grounded neutral test in synchrony with the real-time sampling rate of the signal FB.

When microcontroller 310 determines a grounded neutral fault has occurred, the GFCI function block 845 trips the GFCI receptacle 100 as described above with respect to the main ground fault detection subroutine. Accordingly, the microcontroller 310, and more particularly the GFCI function block 845, is configured to detect the presence of a grounded neutral fault and trip the GFCI receptacle 100 in response to determining that a grounded neutral fault is present. In some embodiments, the microcontroller 310 is configured to transmit, via the communication circuit 425, a signal indicative of the occurrence of a grounded neutral fault to an external device. In some embodiments, the microcontroller 310 is configured to determine GFCI receptacle 100 EOL has been reached after a grounded neutral fault has been detected.

In some embodiments, the GFCI function block 845 is configured to perform the grounded neutral test differentially. In such embodiments, the GFCI function block 845 is configured to sample, and determine, a baseline of the signal FB before applying the grounded neutral test signal GN-TEST. If the difference between the baseline of the signal FB and the signal V-REF exceeds a fault threshold, the GFCI function block 845 trips the receptacle 100. However, if the difference between the baseline of the signal FB and the signal V-REF does not exceed the fault threshold, the GFCI function block 845 applies the grounded neutral signal GN-TEST to the conductor 890. Furthermore, the GFCI function block 845 samples the signal FB a second time (e.g., samples a second signal FB) while the grounded neutral signal GN-TEST is applied to the conductor 890. Then, the GFCI function block 845 determines a change, or difference, between the baseline of signal FB and the second signal FB and compensates the difference with respect to temperature. If a difference between the compensated second signal FB and the exceeds the fault threshold, the GFCI function block 845 determines that a grounded neutral condition is present, or has occurred, within the GFCI receptacle 100 and trips the GFCI receptacle 100.

Self-Test Subroutines

Frequency Measurement

As discussed in more detail below, the microcontroller 310 is further configured to execute various self-test and monitoring subroutines, such as the ground fault detection self-test and a solenoid self-test subroutines. However, in some embodiments, the microcontroller 310 is configured to execute a frequency determination subroutine before executing one or more of the self-test subroutines. Although described as being performed by the GFCI function block 845, it should be understood that, in some embodiments, the frequency determination subroutine is executed by one or more of the other function blocks included in microcontroller 310, such as the self-test function block 850.

While executing the frequency determination subroutine, the microcontroller 310 is configured to measure a frequency of the input voltage received by GFCI receptacle 100 (e.g., a frequency of the mains power signal applied to the line side of the GFCI receptacle 100). In particular, the GFCI function block 845 is configured to measure the input voltage frequency by counting a number of positive zero crossings of the input voltage detected by the solenoid driver and zero-cross detection circuit 805 over a predetermined time-period (e.g., a two second time period). The GFCI function block 845 is configured to monitor a zero crossing signal ZC which is output by the solenoid driver and zero-cross detection circuit 805 and received at input pin RA2 of the microcontroller 310, for a predetermined time-period. The GFCI function block 845 then divides the number of positive zero crossings by the predetermined time-period (e.g., two) to calculate the frequency of the input voltage. As shown in FIG. 9B, in some embodiments, the point at which voltage zero-crosses are detected is located at the anode of D4. Detecting the voltage zero-crosses at the anode of D4 improves reliability of the zero-cross detection circuit 805 by allowing the zero-cross detection circuit 805 to sense an un-rectified line voltage.

In some embodiments, if the frequency is outside of a predetermined range, the microcontroller 310 is configured to prevent execution of one or more of the self-test subroutines until the measured frequency is within the predetermined range. For example, in some embodiments, the predetermined frequency range is approximately 50 Hz to approximately 70 Hz. However, in some embodiments, it should be understood that GFCI receptacle 100 is used in applications, such as a generator application, in which the operating frequency is higher than the 50 Hz to 70 Hz range. In other embodiments, if the frequency is outside of the predetermined range, the microcontroller 310 is configured to post-pone scheduled self-tests, such as a ground fault detection self-test and/or a solenoid self-test, until the frequency is within the predetermined range. In some embodiments, if the frequency is determined to be approximately zero Hz, the GFCI function block 845 repeats execution of the frequency determination subroutine to re-measure the frequency, for example but not limited to, two-seconds after determining the frequency is approximately zero Hz. In some embodiments, execution of the frequency determination subroutine is repeated until the frequency is not equal to zero Hz. In some embodiments, execution of the frequency determination subroutine is repeated a predetermined number of times while the frequency is approximately equal to zero Hz. In some embodiments, if the frequency is measured to be equal to zero Hz after a predetermined number (e.g., eight) of consecutive executions of the frequency determination subroutine, the microcontroller 310 is configured to determine that the GFCI receptacle 100 has reached its end-of-life (EOL).

In some embodiments, the GFCI function block 845 is configured to execute the frequency determination subroutine while the microcontroller 310 executes the main ground fault detection subroutine and/or other self-test subroutines. In some embodiments, the GFCI function block 845 is configured to execute the frequency determination subroutine according to a priority order. For example, the GFCI function block 845 is configured to execute the frequency determination subroutine after the main ground fault detection routine is executed by microcontroller 310. In some embodiments, the GFCI function block 845 is configured to execute the frequency determination subroutine periodically. In some embodiments, the GFCI function block 845 is configured to execute the frequency determination subroutine on an on-demand basis. For example, the GFCI function block 845 is configured to execute the frequency determination subroutine in response to receiving, via the communication circuit 425, a control signal from an external device.

In some embodiments, the GFCI function block 845 is additionally configured to perform a filtering operation while executing the frequency determination subroutine. The filtering operation is performed to block out noise of the input voltage. In some embodiments, a low-pass filtering operation is performed. In some embodiments, the frequency is sampled at a predetermined rate (e.g., every three milliseconds).

Ground Fault Detection Self-Test

The microcontroller 310, and in particular, the self-test function block 850, is configured to perform a ground fault self-test by executing a ground fault detection self-test subroutine. The ground fault detection self-test is performed to determine whether the microcontroller 310, and more specifically the GFCI function block 845, is capable of correctly detecting one or more fault conditions caused by a ground fault. In some embodiments, the self-test function block 850 is configured to perform the ground fault detection self-test within a predetermined amount of time of the GFCI receptacle 100 receiving power (e.g., approximately five seconds). In some embodiments, the self-test function block 850 is configured to perform the ground fault detection self-test in response to receiving a control signal from an external device. In some embodiments, the self-test function block 850 is configured to perform the ground fault detection self-test periodically, or at predetermined time intervals (e.g., once every minute). In such embodiments, if the ground fault detection self-test is failed, the self-test function block 850 is configured to repeat performance of the ground fault detection self-test, or retest, a predetermined amount of time (e.g., two seconds) after failure of the initial test. In some embodiments, the self-test function block 850 is configured to retest until the ground fault detection self-test is passed or a predetermined number of additional failures (e.g., seven) have occurred. In some embodiments, the microcontroller 310 is configured to determine GFCI receptacle 100 EOL has been reached after eight consecutive failures of the ground fault detection self-test. In other embodiments, the microcontroller 310 is configured to determine GFCI receptacle 100 EOL after fewer or greater than eight consecutive failures of the ground fault detection self-test.

In some embodiments, the self-test function block 850 is configured to perform the ground fault detection self-test after the frequency of input voltage provided to the GFCI receptacle 100 is determined. In such embodiments, after a frequency of the input voltage is determined, the self-test function block 850 is configured to output a self-test ground fault signal ST-FAULT from output pin RC4 of microcontroller 310. In particular, the self-test function block 850 is configured to output the self-test ground fault signal ST-FAULT at a predetermined period (e.g., $\frac{5}{16}$th of the frequency of the input voltage) after the input voltage has crossed the positive zero (i.e., during the negative half-cycle of the input voltage). In other embodiments, the self-test function block 850 is configured to output the self-test ground fault signal ST-FAULT at any period of the frequency of the input voltage. In some embodiments, the self-test ground fault signal ST-FAULT is output by the self-test function block 850 for a predetermined duration (e.g., approximately eight milliseconds).

The self-test ground fault signal ST-FAULT is output to a self-test switch 910 included in the ground fault test driver and load monitor circuit 820. In some embodiments, the self-test switch 910 is a transistor, such as but not limited to a BJT semiconductor. Upon receiving the self-test ground fault signal ST-FAULT, the self-test switch 910 is activated. When the self-test switch 910 is activated, and the phase and neutral contacts 240-255 are closed, current flows through diodes D5 and D6 included in the ground fault test drive and load monitor circuit 820. In particular, current respectively flows from load side conductors 880, 885 to self-test switch 910 through diodes D5, D6 and resistor R20. In some embodiments, the resistor R20 limits the current flowing through self-test switch 910 to approximately 8 mA$_{RMS}$. Current flows out of the self-test switch 910 and returns through signal ground and diode bridge D1. Thus, the current flowing through self-test switch 910 does not return through the sense transformer 825 and a current imbalance is detected between line side conductor 865, 870.

As described above, when a current imbalance between line side conductors 865, 870 is detected, the GFCI function block 845 is configured to output the control signal SCR-OUT to the solenoid switch 905. In particular, when a current imbalance is detected during the ground fault self-test, GFCI function block 845 outputs the control signal SCR-OUT near a zero-crossing while the line voltage is in the negative half cycle. Activation of solenoid switch 905 during the negative half cycle is prevented by diode D4. The GFCI function block 845 then monitors the signal SCR-MON as the line voltage begins to rise following the zero-crossing to determine whether the SCR-OUT has been properly output by GFCI function block 845 and solenoid switch 905 is capable of conducting. In some embodiments, the signal SCR-MON is a half-wave rectified signal having a scaled voltage between 0V and 3.3V. When signal SCR-OUT is asserted, the condition of the signal SCR-OUT can be determined by monitoring the signal SCR-MON before the line voltage is sufficiently large to energized the solenoid 210. Accordingly, the GFCI function block 845 is operable to determine whether solenoid switch 905 is capable of conducting without having to energize the solenoid 210.

For example, in some embodiments, the voltage value of signal SCR-MON decreases when the control signal SCR-OUT has been output and solenoid switch 905 is conducting. When the GFCI function block 845 determines that solenoid switch 905 is capable of conducting after outputting the control signal SCR-OUT, the microcontroller 310 is configured to determine that the ground fault self-test was successful. However, if the GFCI function block 845 does not determine that solenoid switch 905 is capable of conducting after outputting the control signal SCR-OUT, the microcontroller 310 is configured to determine that the ground fault self-test has failed.

Solenoid Self-Test

The microcontroller 310, and more particularly the GFCI function block 845, is further configured to perform a solenoid self-test by executing the solenoid self-test subroutine. In some embodiments, the solenoid self-test is performed within a predetermined time of the GFCI receptacle 100 receiving power (e.g., approximately five seconds). The solenoid self-test is performed by the GFCI function block 845 to determine whether the solenoid drive and zero-cross detection circuit 805, and more specifically the solenoid 210, is operating correctly. In some embodiments, the GFCI function block 845 is configured to perform the solenoid self-test periodically (e.g., once every minute). In some embodiments, the GFCI function block 845 is configured to perform the solenoid self-test at a predetermined time period (e.g., approximately thirty-seconds) after the ground fault self-test is performed. In such an embodiment, the ground fault self-test or the solenoid self-test occurs every thirty-seconds. Similar to the ground fault self-test, if the solenoid self-test is failed, the GFCI function block 845 is configured to perform a retest. In some embodiments, the GFCI function block 845 is configured to retest the solenoid 210 until the solenoid self-test is passed or seven additional failures of the solenoid self-test have occurred. In some embodiments, the microcontroller 310 is configured to determine GFCI receptacle 100 EOL has been reached after a predetermined number (e.g., eight) of consecutive failures of the solenoid self-test.

Similar to the ground fault detection self-test subroutine, the GFCI function block 845 is configured to perform the solenoid self-test s after the frequency of the input voltage has been determined. In some embodiments, after frequency of the input voltage has been determined, the GFCI function block 845 is configured to output a solenoid test signal SCR-OUT at a second predetermined period (e.g., %16th) of the frequency of the input voltage after the input voltage has crossed the positive zero (i.e., during the negative half-cycle of the input voltage). However, in other embodiments, the solenoid self-test is performed at the same predetermined period as the ground fault detection self-test.

The solenoid test signal SCR-OUT is output from pin RA5 of microcontroller 310 and received by the solenoid switch 905 (e.g., at the gate of the solenoid switch 905). The solenoid test signal SCR-OUT activates the solenoid switch 905, thus allowing current to flow through the solenoid 210. As described above, the GFCI function block 845 is configured to detect whether current flowing through the solenoid 210 by monitoring a value of the signal SCR-MON. When solenoid switch 905 is conducting, thereby causing current to flow through the solenoid 210, the voltage of signal SCR-MON decreases towards signal ground potential. However, when a failure has occurred and solenoid switch 905 is not conducting, the voltage of signal SCR-MON increases away from signal ground potential. Accordingly, the GFCI function block 845 is configured to determine that the solenoid self-test has passed when the detected voltage of signal SCR-MON decreases towards signal ground potential. When the solenoid self-test has been passed, the GFCI function block 845 is configured to stop output of the solenoid test signal SCR-OUT. In some embodiments, the microcontroller 310 is configured to transmit, via the communication circuit 425, a signal indicative of a successful solenoid self-test to an external device. However, when the detected voltage of signal SCR-MON increases away from the signal ground potential, the GFCI function block 845 is configured to determine that the solenoid self-test has failed.

Welded Contact Self-Test

In some embodiments, the microcontroller 310 is further configured to perform a welded contact self-test by executing the welded contact self-test subroutine. The microcontroller 310 is configured to perform the welded contact self-test after any instance in which the microcontroller 310 trips the GFCI receptacle 100. That is, the microcontroller 310 is configured to perform the welded contact self-test after each time the microcontroller 310 sends the control signal SCR-OUT to solenoid switch 905 (e.g., the microcontroller 310 activates solenoid 210 to trip the circuit).

While performing the welded contact self-test, the microcontroller 310, and more particularly the self-test function block 850, is configured to monitor the load signal LOAD-MON output by the ground fault test driver and load monitor circuit 820. The load signal LOAD-MON is indicative of the voltage across resistor R19 included in the ground fault test driver and load monitor circuit 820. When the line side contacts 240, 245 are separated from the load side contacts 250, 255, the voltage across R19 is zero. Therefore, the self-test function block 850 is configured to determine that the welded contact self-test has been passed when the load signal LOAD-MON indicates zero voltage across R19 after solenoid switch 905 is activated. In some embodiments, the microcontroller 310 is configured to transmit, via the communication circuit 425, a signal indicative of a successful welded contact self-test to an external device.

However, when the self-test function block 850 detects, via load signal LOAD-MON, a non-zero voltage across R19 after activation of the solenoid switch 905, the self-test function block 850 is configured to determine that the welded contact self-test has failed and that line side contacts 240, 245 are welded, or otherwise stuck, to the load side contacts 250, 255. In some embodiments, the microcontroller 310 is configured to determine EOL of the GFCI receptacle 100 has been reached after a failed welded contact self-test. In some embodiments, the microcontroller 310 is configured to determine EOL of the GFCI receptacle 100 has been reached after a predetermined number (e.g., eight) of consecutive failures of the welded contact self-test.

EOL Subroutine

As described above, the microcontroller 310 is configured to determine that GFCI receptacle 100 EOL has been reached after one or more of the self-tests performed by the microcontroller 310 have satisfied a failure condition, such as a predetermined number of consecutive self-test failures. Accordingly, in some embodiments, the microcontroller 310 is configured to execute an EOL subroutine after determining that the GFCI receptacle 100 has reached its EOL. In some embodiments, the microcontroller 310 is configured to activate one or more of the visual and/or audible indicators 415, 420 included in indication circuit 410 while executing the EOL subroutine. For example, the microcontroller 310 is configured to illuminate one or more of the visual indicators 415 in accordance with an EOL illumination state and/or activate one or more of the audible indicators 420 when in accordance with an EOL audible pattern while executing the EOL subroutine.

In some embodiments, the microcontroller 310 is configured to transmit, by the communication circuit 425, a signal indicative of GFCI receptacle 100 EOL to an external device while executing the EOL subroutine. For example, microcontroller 310 is configured to generate an EOL signal that indicates GFCI receptacle 100 needs to be replaced and transmit the EOL signal to the communication circuit 425. Accordingly, the communication circuit 425 wirelessly transmits, via the transceiver 430, the EOL signal to an external device.

In some embodiments, the microcontroller 310 is configured to permanently trip, or deactivate, the GFCI receptacle 100 in response to determining EOL of the GFCI receptacle 100 has been reached. Accordingly, in such embodiments, the GFCI function block 845 is configured to output the control signal SCR-OUT to solenoid switch 905 while executing the EOL subroutine.

AFCI Subroutine

As described above, the primary board 200 is electrically connected to a third board 600, which includes an AFCI detection circuit 630, via the interface 315. As shown in FIG. 8A, the interface 315 includes connection pin ports, or ports, 1-6, which are configured to receive the electrical pins 605 of the third board. In some embodiments, connection ports 1 and 2 are configured as dedicated power ports used for transferring power between the primary board 200 and third board 600. In such embodiments, the remaining connection pins 3-6 is configured as serial communication ports, such as SPI links, used to transfer serial data signals between the microcontroller 310, and more particularly the AFCI function block 855, and the microcontroller of the third board 600. For example, in some embodiments, connection port 3 is used to transmit the zero-cross signal ZC from the microcontroller 310 to the microcontroller included in the arc fault detection circuit 630. As another example, in some embodiments, connection port 4 is configured as an arc fault indicator flag. In such an example, connection port 4 is configured to transmit an arc fault detection signal SCR/MISO from the microcontroller included in arc fault detection circuit 630 to the AFCI function block 855. Similarly, in some embodiments, connection port 6 is configured as an arc fault self-test port, which is used to transmit an arc fault test signal TEST/SCLK between the AFCI function block 855 and the arc fault detection circuit 630.

In some embodiments, the AFCI function block 855 is configured to execute an AFCI subroutine. In such embodiments, the AFCI function block 855 is configured to execute the AFCI subroutine and the main ground fault detection subroutine simultaneously. While executing the AFCI subroutine, the AFCI function block 855 is configured to monitor the arc fault detection signal SCR/MISO, which is output by the microcontroller included in arc fault detection circuit 630, for the occurrence of an arc fault. In such embodiments, then the AFCI function block 855 determines that an arc fault has occurred, the microcontroller 310 is configured to trip the GFCI receptacle 100.

In some embodiments, while executing the AFCI subroutine, the AFCI function block 855 is configured to receive a signal indicative of the results of an AFCI self-test form the microcontroller included in the arc fault detection circuit 630. In some embodiments, while executing the AFCI subroutine, the AFCI function block 855 is further configured to instruct the arc fault detection circuit 630 to perform an arc fault detection self-test. In some embodiments, when the AFCI function block 855 determines that the AFCI self-test has passed, the microcontroller 310 is configured to transmit, via the communication circuit 425, a signal indicative of a successful AFCI self-test to an external device. However, in such embodiments, the microcontroller 310 is configured to determine EOL of the GFCI receptacle 100 has been reached when the AFCI function block 855 determines the AFCI self-test has failed. In some embodiments, the microcontroller 310 is configured to determine EOL of the GFCI receptacle 100 has been reached after a predetermined number (e.g., eight) of consecutive failures of the AFCI self-test.

Additional Subroutines

Figure 10:
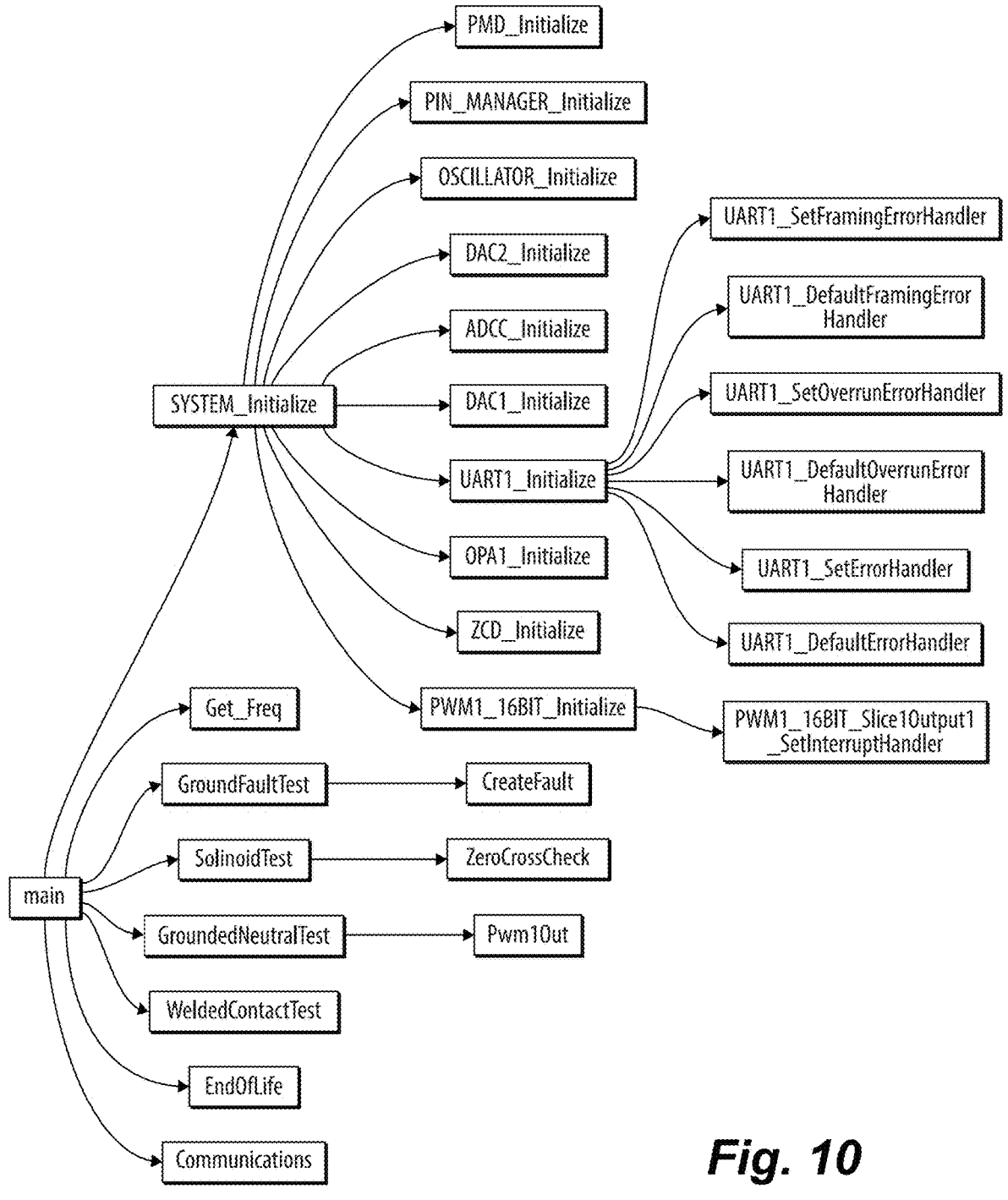
FIG. 10 is a block diagram illustrating a plurality of routines and subroutines executed by the control system of FIGS. 8A-8B, according to some embodiments of the application.

In some embodiments, the microcontroller 310 is configured to execute one or more additional subroutines during operation of the GFCI receptacle. For example, in some embodiments, the microcontroller 310 is configured to execute a system initialize subroutine. As shown in FIG. 10, execution of the system initialize subroutine includes checking the memory, establishing pin and port configurations, initializing one or more of the GFCI circuit components, initializing an oscillator, initializing A/D converters, initializing the zero-cross detection circuit, and etc. In some embodiments, the system initialize subroutine is executed at power-up of the GFCI receptacle 100.

In some embodiments, the microcontroller 310 is configured to execute a communication subroutine. The communication subroutine is executed by microcontroller 310 to enable communication between the primary board 200 and the third board 600. That is, the microcontroller 310 executes the communication subroutine while communicating with the microcontroller included in the arc fault detection circuit 630.

In some embodiments, the microcontroller 310 is configured to execute a moisture detection subroutine. In such embodiments, a moisture detection circuit 835 is included in the primary board 200 or the secondary board 400. The moisture detection circuit 835 includes one or more moisture sensors that are configured to output signals indicative of the moisture level within and/or near the GFCI receptacle 100 to the microcontroller 310. While executing the moisture detection subroutine, the microcontroller 310 is configured to monitor the moisture level signals received form the moisture detection circuit 835 and determine whether an excessive level of moisture is present. For example, the microcontroller 310 is configured to compare the moisture level sensed by the moisture detection circuit 835 to a moisture threshold. In such embodiments, the microcontroller 310 is configured to trip the GFCI receptacle 100 when moisture levels within the GFCI receptacle 100 exceed the moisture threshold. Furthermore, in such embodiments, the microcontroller 310 is configured to transmit, via the communication circuit 425, a signal indicative of excess moisture within the GFCI receptacle 100 when sensed moisture levels exceed the threshold.

In some embodiments, the microcontroller 310 is configured to determine a load side connection status by executing a load side connection subroutine. In some embodiments, the microcontroller 310 is configured to determine load side connection status by monitoring the voltage present at the base of self-test switch 910. In such embodiments, the microcontroller 310 is configured to determine that the load side is connected to the line side when there is a non-zero voltage present at the base of self-test switch 910. In some embodiments, the microcontroller 310 is configured to determine load side connection status by monitoring the load signal LOAD-MON. In such embodiments, when the load signal LOAD-MON indicates the presence of a non-zero voltage across R19, the microcontroller 310 is configured to determine that the load side is connected to the line side. In some embodiments, the microcontroller 310 is configured to determine load side connection status by monitoring the voltage across a capacitor that is created from PCB substrate and tied to the phase load terminal.

Snap-to-Connect Embodiment

Although illustrated in FIGS. 1-6 as including terminal screws configured for receiving power from an external power source and/or providing power to additional downstream devices, in some embodiments, the GFCI receptacle 100 includes different terminal connection components configured to receive power from the external power source and/or provide power to downstream devices. For example, FIGS. 12-15 illustrate an embodiment of the GFCI receptacle 100 that includes line and load terminal connectors that are coupled to the GFCI receptacle 100 by a snap fit connection.

Figure 12:
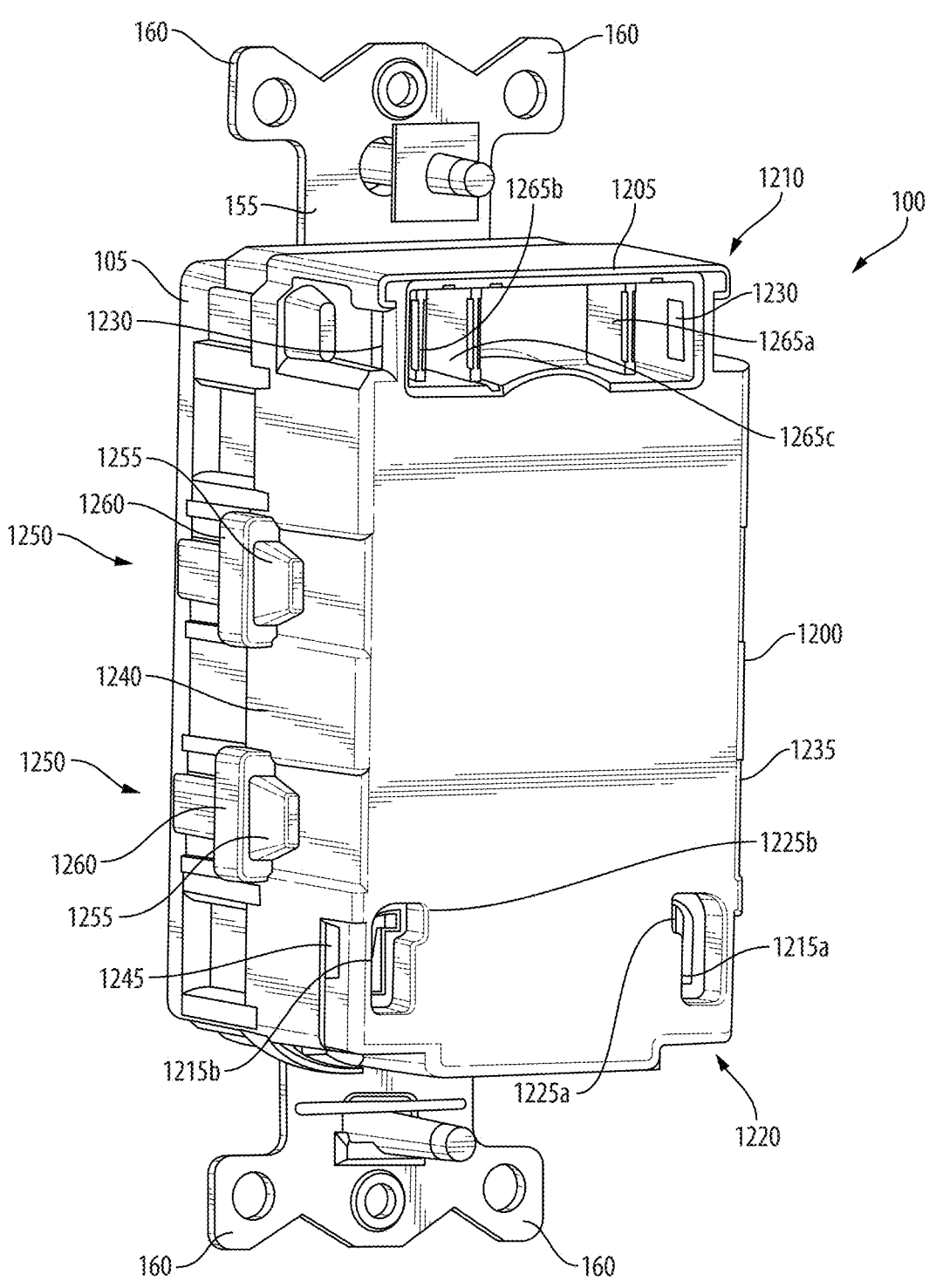
FIG. 12 illustrates a perspective view of a GFCI device, or GFCI receptacle, according to some embodiments.
Figure 13:
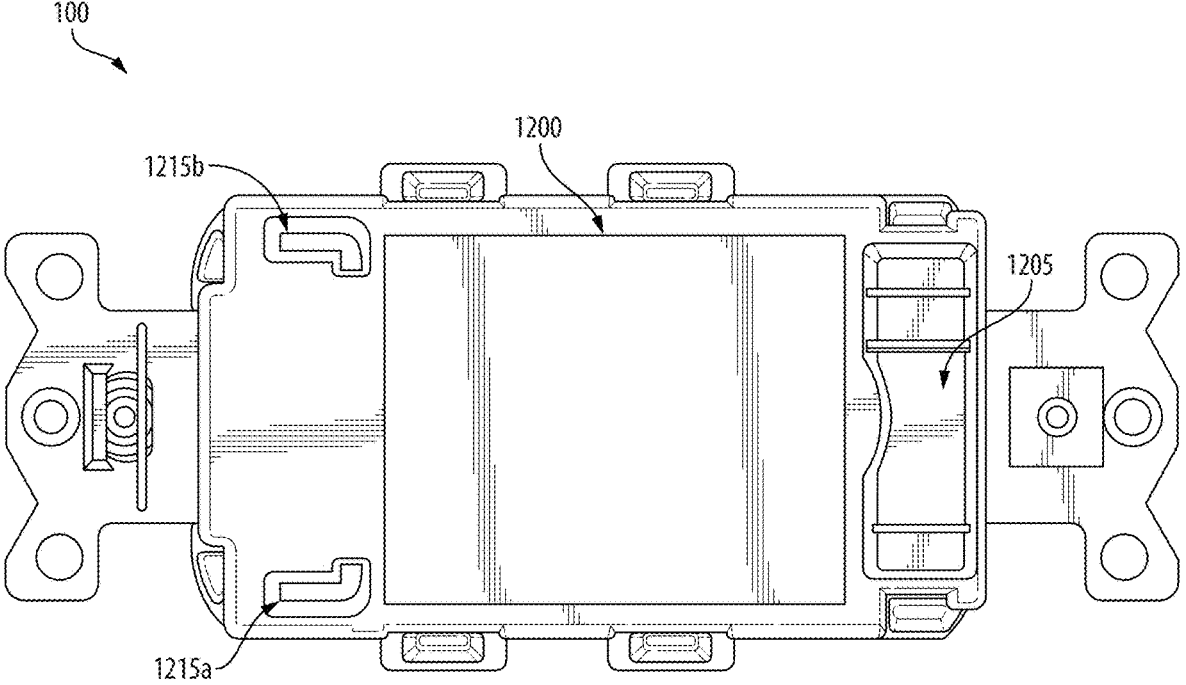
FIG. 13 illustrates a perspective view of a GFCI device, or GFCI receptacle, according to some embodiments.
Figure 14:
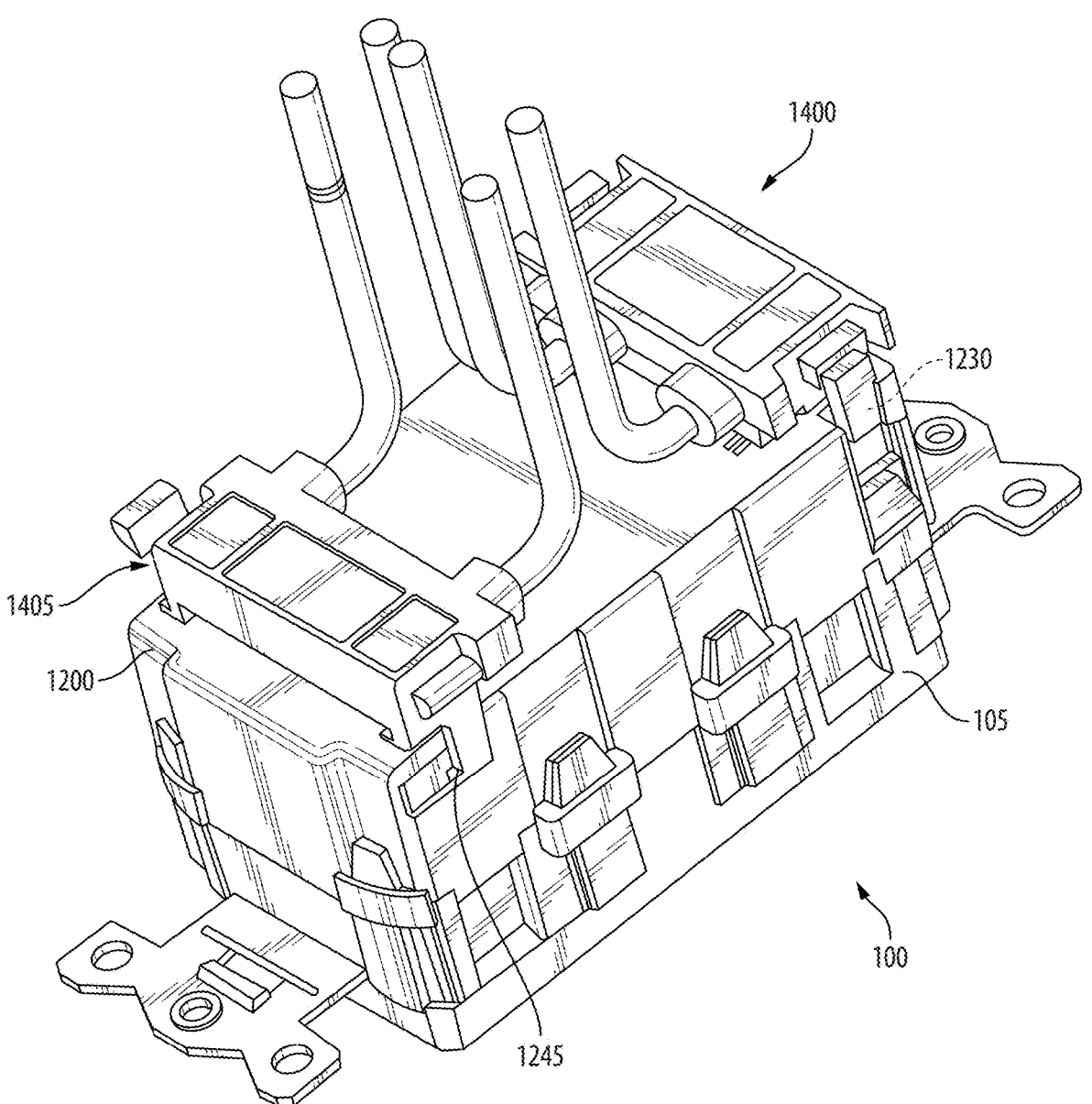
FIG. 14 illustrates a perspective view of a GFCI device, or GFCI receptacle, according to some embodiments.

In particular, FIGS. 12-14 illustrate perspective views of the snap fit connection embodiment of GFCI receptacle 100. As shown in FIGS. 12 and 13, the rear cover 1200 of the GFCI receptacle 100 includes a first aperture 1205 adjacent a first end 1210 and a pair of apertures 1215a, 1215b adjacent a second, opposite end 1220. The pair of apertures 1215a, 1215b in the rear cover 1200 are substantially L-shaped and are sized and shaped such that a standard wire is too large to be inserted therein. The pair of apertures 1215a, 1215b are each positioned within a similarly L-shaped recess 1225a, 1225b. As shown, each of the apertures 1215a, 1215b and the pair of recesses 1225a, 1225b have a substantially 90 degree bend between a first end and a second end thereof. The rear cover 1200 also includes a first pair of apertures or pockets 1230 that extend through opposite sides 1235, 1240 of the rear cover 1200 and a second pair of apertures or pockets 1245 that extend through the opposite sides 1235, 1240 of the rear cover 1200. The first pair of pockets 1230 is positioned adjacent the first end 1210 and the second pair of pockets 1245 is positioned adjacent the second end 1220.

The rear cover 1200 is secured to front cover 105 by fasteners 1250. For example, each fastener 1250 includes a barbed post 1255 on front cover 105 and corresponding resilient hoop 1260 on rear cover 1200. In the illustrated embodiment, there are eight fasteners, although more or less than eight fasteners can be used in other embodiments.

With respect to FIG. 14, a first connector 1400 (e.g., line connector, upstream connector) is coupled to the GFCI receptacle 100 by a snap fit connection. In particular, the first connector 1400 is connected, by a snap fit connection, to a set of input terminals (e.g., input blade male terminals) that are accessible through the first aperture 1205 formed in the rear cover 1200 of GFCI receptacle 100. The input terminals include a phase, or hot, terminal 1265a, a neutral terminal 1265b, and a ground terminal 1265c. The phase terminal 1265a and the neutral terminal 1265b are in electrical communication (e.g., via the primary board 200) with the respective line contact arms 220, 225. Each of the input terminals are in electrical communication with the primary board 200 and configured to input electrical power to the receptacle 100 from a power source. In particular, the input terminals 1265a-1265c are configured to receive electrical power from corresponding terminals of the first connector 1400 while the first connector 1400 is coupled to the GFCI receptacle 100. In some embodiments, the first connector 1400 is removably coupled to the GFCI receptacle 100.

Figure 15:
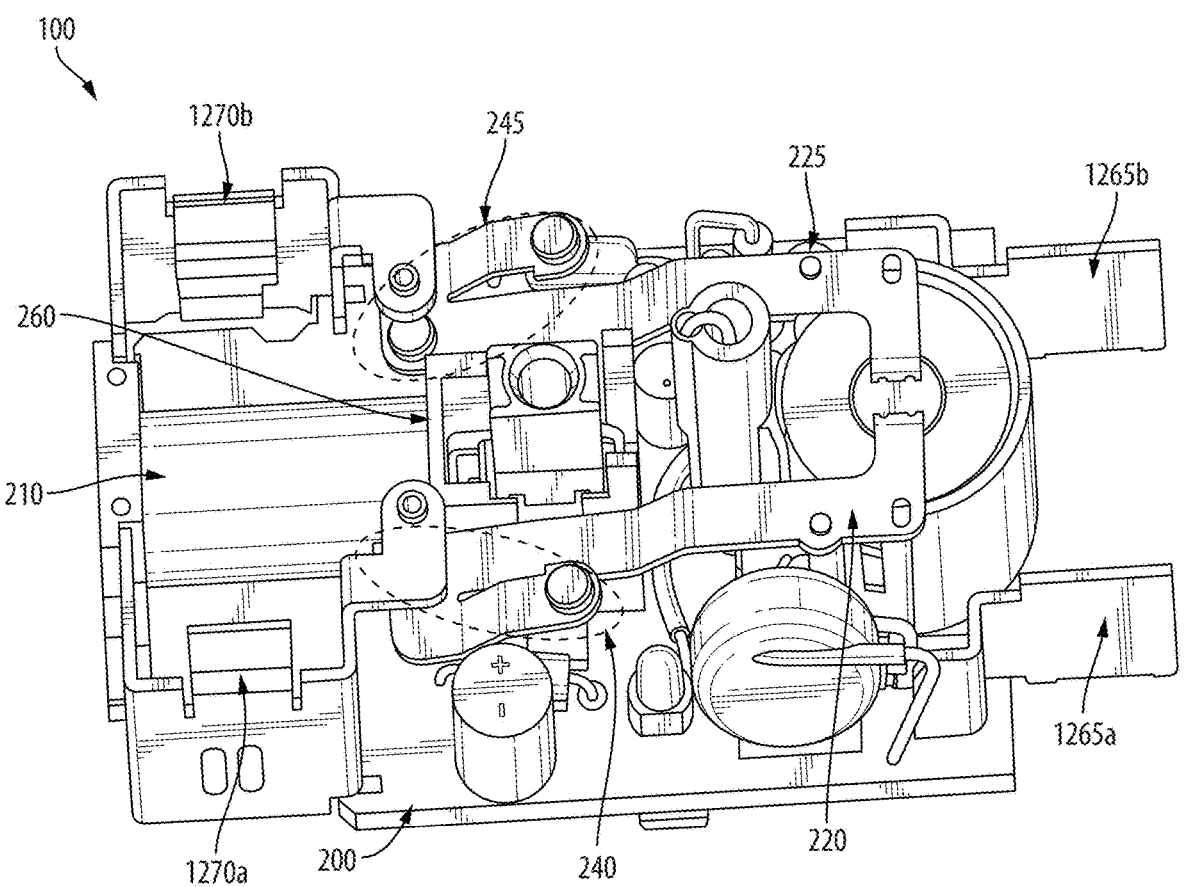
FIG. 15 illustrates a perspective view of the GFCI receptacle of FIGS. 12-14 with front and rear covers removed to expose working components, according to some embodiments.

Similarly, a second connector 1405 (e.g., load connector, downstream connector) is coupled to the GFCI receptacle 100 by a snap fit connection. In particular, the second connector 1405 is connected, by a snap fit connection, to a set of output load terminals that are accessible through the apertures 1215a, 1215b. The output terminals include a phase, or hot, terminal 1270a and a neutral terminal 1270b (FIG. 15). The phase terminal 1270a and the neutral terminal 1270b are in selective physical and electrical communication (e.g., via the primary board 200) with the respective load contact arms 230, 235. The output terminals 1270a, 1270b are configured to provide electrical power to corresponding terminals of the second connector 1405 while the second connector 1405 is coupled to the GFCI receptacle 100 and the load contact arms 230, 235 are physically and electrically coupled to the output terminals 1270a, 1270b. In some embodiments, the second connector 1405 is removably coupled to the GFCI receptacle 100.

FIG. 15 illustrates a perspective view of the snap fit connection embodiment of GFCI receptacle 100 with the front cover 105 and rear cover 1200 removed to expose the working components of the GFCI receptacle 100. As shown in FIG. 15, the output terminals 1270*a*, 1270*b* are mounted to the primary board 200. In combination with the first and second apertures 1215*a*, 1215*b*, the output terminals 1270*a*, 1270*b* serve as the receiving terminals of the snap fit connection connector 1405.

What is claimed is:

1. A circuit interrupting device comprising:
a phase conductor;
a neutral conductor;
an interrupter configured to disconnect the phase conductor and the neutral conductor from a load;
a sensor configured to generate a first signal indicative of current flowing through at least one selected from a group consisting of the phase conductor and the neutral conductor; and
a microcontroller electrically connected to the sensor and the interrupter, the microcontroller including an electronic processor configured to:
receive the first signal from the sensor,
compensate the first signal with respect to a temperature of the microcontroller,
determine whether a difference between the first signal and a reference signal exceeds a threshold, and
activate the interrupter when the difference exceeds the threshold.

2. The circuit interrupting device of claim 1, wherein the sensor is a transformer that includes an aperture through which the phase conductor and the neutral conductor pass through; and
wherein the first signal is generated in a first conductor that is wound around the transformer and electrically connected to the microcontroller.

3. The circuit interrupting device of claim 2, wherein the circuit interrupting device further includes a second transformer that includes a second aperture through which the phase conductor and the neutral conductor pass through; and
wherein a second conductor is wound around the second transformer and electrically connected to the microcontroller.

4. The circuit interrupting device of claim 3, wherein the microcontroller is further configured to:
apply a test signal to the second conductor;
receive a second signal indicative of a current flowing through the phase conductor and the neutral conductor from the sensor;
determine whether a difference between the second signal and the reference signal exceeds the threshold after applying the test signal to the second conductor; and
activate the interrupter when the difference between the second signal and the reference signal exceeds the threshold.

5. The circuit interrupting device of claim 4, wherein the microcontroller is further configured to apply the test signal to the second conductor based on one selected from a group consisting of a phase of a power signal applied to the phase and neutral conductors, a quadrant of the power signal applied to the phase and neutral conductors, a wave shape of the power signal applied to the phase and neutral conductors, a temperature, and a power factor.

6. The circuit interrupting device of claim 4, further comprising a wireless communication circuit electrically connected to the microcontroller; and
wherein the microcontroller is further configured to transmit, by the wireless communication circuit, a signal indicative of an occurrence of a grounded neutral condition to an external device when the difference between the second signal and the reference signal exceeds the threshold.

7. The circuit interrupting device of claim 1, wherein the microcontroller is further configured to determine a frequency of a voltage applied to the phase conductor and neutral conductor based on a zero-cross detection signal; and
wherein the microcontroller is further configured to perform a ground fault self-test after the frequency is determined.

8. The circuit interrupting device of claim 1, further comprising a wireless communication circuit electrically connected to the microcontroller; and
wherein the microcontroller is further configured to transmit, by the wireless communication circuit, a signal indicative of an occurrence of a ground fault to an external device when the difference exceeds the threshold and the microcontroller has not performed a ground fault self-test.

9. The circuit interrupting device of claim 1, further comprising a printed circuit board (PCB);
wherein the microcontroller is electrically connected to the PCB; and
wherein the microcontroller, the phase conductor, the neutral conductor, the sensor, and the interrupter are physically supported by the PCB.

10. A method of operating a circuit interrupting device that includes a phase conductor, a neutral conductor, an interrupter configured to disconnect the phase conductor and the neutral conductor from a load, a sensor configured to generate a signal indicative of current flowing through the phase conductor and the neutral conductor, and a microcontroller electrically connected to the sensor and the interrupter, the microcontroller including an electronic processor, the method comprising:
receiving, by the microcontroller, a first signal indicative of the current flowing through at least one selected from a group consisting of the phase conductor and the neutral conductor from the sensor;
sensing, by a temperature sensor included in the circuit interrupting device, a temperature of the microcontroller;
compensating, by the microcontroller, the signal with respect to the temperature of the microcontroller;
determining, by the microcontroller, whether a difference between the first signal and a reference signal exceeds a threshold; and
activating, by the microcontroller, the interrupter when the difference exceeds the threshold.

11. The method of claim 10, wherein the sensor is a transformer that includes an aperture through which the phase conductor and the neutral conductor pass through; and
wherein the signal is induced on a first conductor that is wound around the transformer and electrically connected to the microcontroller.

12. The method of claim 11, wherein the circuit interrupting device further includes a second transformer that includes a second aperture through which the phase conductor and the neutral conductor pass through; and wherein a second conductor is wound around the second transformer and electrically connected to the microcontroller.

13. The method of claim 12, further comprising:

applying, by the microcontroller, a test signal to the second conductor;

receiving, by the microcontroller, a second signal indicative of current flowing through the phase conductor and the neutral conductor from the sensor;

determining, by the microcontroller, whether a difference between the second signal and the reference signal exceeds the threshold after applying the test signal to the second conductor; and activating, by the microcontroller, the interrupter when the difference between the second signal and the reference signal exceeds the threshold.

\* \* \* \* \*